United States Patent
Ji et al.

(10) Patent No.: US 12,342,341 B2
(45) Date of Patent: Jun. 24, 2025

(54) HIGH-SPEED DATA TRANSMISSION METHOD AND APPARATUS FOR OFDM-BASED SINGLE CARRIER SYSTEM

(71) Applicant: Samsung Electronics Co., Ltd., Suwon-si (KR)

(72) Inventors: Hyoungju Ji, Suwon-si (KR); Juho Lee, Suwon-si (KR); Younsun Kim, Suwon-si (KR); Hoondong Noh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 17/790,861

(22) PCT Filed: Jan. 5, 2021

(86) PCT No.: PCT/KR2021/000070
§ 371 (c)(1),
(2) Date: Jul. 5, 2022

(87) PCT Pub. No.: WO2021/141351
PCT Pub. Date: Jul. 15, 2021

(65) Prior Publication Data
US 2022/0386296 A1 Dec. 1, 2022

(30) Foreign Application Priority Data

Jan. 6, 2020 (KR) .................. 10-2020-0001170

(51) Int. Cl.
*H04W 72/20* (2023.01)
*H04L 27/26* (2006.01)

(52) U.S. Cl.
CPC ......... *H04W 72/20* (2023.01); *H04L 27/2636* (2013.01)

(58) Field of Classification Search
CPC .................. H04W 72/20; H04W 27/2636
See application file for complete search history.

(56) References Cited

U.S. PATENT DOCUMENTS

| 10,270,514 | B2 | 4/2019 | Moon et al. |
| 10,880,157 | B2 | 12/2020 | Lee et al. |
| (Continued) | | | |

FOREIGN PATENT DOCUMENTS

| KR | 10-2015-0046869 A | 5/2015 |
| KR | 10-2016-0104683 A | 9/2016 |
| (Continued) | | |

OTHER PUBLICATIONS

Korean Office Action dated Mar. 19, 2025, issued in Korean Application No. 10-2020-0001170.

*Primary Examiner* — Wayne H Cai
(74) *Attorney, Agent, or Firm* — Jefferson IP Law, LLP

(57) ABSTRACT

The present disclosure relates to a communication technique for merging, with an IoT technology, a 5G communication system for supporting a higher data transmission rate than a 4G system, and a system therefor. The present disclosure can be applied to intelligent services (for example, smart homes, smart buildings, smart cities, smart cars or connected cars, healthcare, digital education, retail businesses, security- and safety-related services, and the like) on the basis of a 5G communication technology and an IoT-related technology. A terminal according to an embodiment of the present disclosure can prepare signal processing before receiving a data signal by storing, in a memory, information pre-configured from a base station and reconstruct a signal by sequentially and rapidly processing time symbols in sample units, thereby performing fast signal processing on a single carrier.

15 Claims, 19 Drawing Sheets

(56) References Cited

U.S. PATENT DOCUMENTS

| | | | |
|---|---|---|---|
| 2016/0309376 A1 | 10/2016 | Liu et al. | |
| 2017/0070377 A1* | 3/2017 | Sawahashi | ........ H04L 25/03305 |
| 2019/0199552 A1 | 6/2019 | Liu et al. | |
| 2020/0396730 A1 | 12/2020 | Kim et al. | |
| 2023/0133797 A1* | 5/2023 | Jiang | .................. H04L 27/2623 370/330 |

FOREIGN PATENT DOCUMENTS

| | | |
|---|---|---|
| KR | 10-2016-0133167 A | 11/2016 |
| KR | 10-2017-0085458 A | 7/2017 |
| KR | 10-2018-0039512 A | 4/2018 |
| KR | 10-2018-0058107 A | 5/2018 |
| KR | 10-2021-0037466 | 4/2021 |
| KR | 10-2021-0040703 | 4/2021 |

* cited by examiner

HIGH-SPEED DATA TRANSMISSION METHOD AND APPARATUS FOR OFDM-BASED SINGLE CARRIER SYSTEM

TECHNICAL FIELD

The disclosure relates to a technology for processing signals in a wireless communication system and, more particularly, to a method and an apparatus for high-speed signal processing for a single carrier system based on orthogonal frequency division multiplexing (OFDM).

BACKGROUND ART

To meet the demand for wireless data traffic having increased since deployment of 4G communication systems, efforts have been made to develop an improved 5G or pre-5G communication system. Therefore, the 5G or pre-5G communication system is also called a "beyond 4G network" communication system or a "post LTE" system. The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

In addition, there has been ongoing research regarding a method for transmitting signals in a super-high-frequency band in order to implement a higher data transmission rate in future communication systems.

DISCLOSURE OF INVENTION

Technical Problem

It is an aspect of the disclosure to provide a method and an apparatus for enabling low-latency signal transmission by processing data at a super-high speed in a super-high-frequency band.

Solution to Problem

In order to solve the above-mentioned problems, the disclosure provides a method by a transmitter in a wireless communication system, the method including: transmitting, to a receiver, configuration information for signal transmission; generating a weight used for signal processing for transmission signal generation, based on the configuration information, and storing the weight; transmitting, to the receiver, control information including time domain resource allocation information indicating a signal allocation resource; generating a transmission signal by performing the signal processing on a modulation symbol to be transmitted by using the stored weight; and transmitting the generated transmission signal to the receiver through the signal allocation resource, wherein the weight is multiplied for each time sample of the transmission signal during the signal processing.

In addition, the method may further include receiving, from the receiver, UE capability information related to whether high-speed signal processing is possible or whether time domain signal processing is possible. In addition, the configuration information may include fast Fourier transform size (FFT size) information, allocated frequency resource information, and discrete Fourier transform precoding size (DFT precoding size) information. In addition, the configuration information may include FFT size information, and the control information may further include allocated frequency resource information. In addition, the method may further include determining a frequency index to which a signal is to be allocated based on information to be transmitted, and the weight may be generated based on the frequency index.

In addition, a method by a receiver in a wireless communication system may include: receiving, from a transmitter, configuration information for signal transmission; generating a weight used for signal processing for transmission signal generation, based on the configuration information, and storing the weight; receiving, from the transmitter, control information including time domain resource allocation information indicating a signal allocation resource; receiving a received signal from the transmitter through the signal allocation resource; and identifying a modulation symbol by performing the signal processing on the received signal by using the stored weight, wherein the weight corresponds to each time sample of the transmission signal during the signal processing.

In addition, a transmitter in a wireless communication system may include: a transceiver; and a controller which is connected to the transceiver and configured to perform control to transmit, to a receiver, configuration information for signal transmission, generate a weight used for signal processing for transmission signal generation, based on the configuration information, and storing the weight, transmit, to the receiver, control information including time domain resource allocation information indicating a signal allocation resource, generate a transmission signal by performing the signal processing on a modulation symbol to be transmitted by using the stored weight, and transmit the generated transmission signal to the receiver through the signal allocation resource, wherein the weight is multiplied for each time sample of the transmission signal during the signal processing.

In addition, a receiver in a wireless communication system may include: a transceiver; and a controller which is connected to the transceiver and configured to perform control to receive, from a transmitter, configuration information for signal transmission, generate a weight used for signal processing for transmission signal generation, based on the configuration information, and storing the weight, receive, from the transmitter, control information including time domain resource allocation information indicating a signal allocation resource, receive a received signal from the transmitter through the signal allocation resource, and identify a modulation symbol by performing the signal processing on the received signal by using the stored weight, wherein the weight corresponds to each time sample of the transmission signal during the signal processing.

Advantageous Effects of Invention

According to the disclosure, high-speed signal processing is possible through a transmission method which enables fast transmission processing and fast reception processing through pre-stored sample signal processing with regard to symbols transmitted successively.

MODE FOR THE INVENTION

Figure 1:
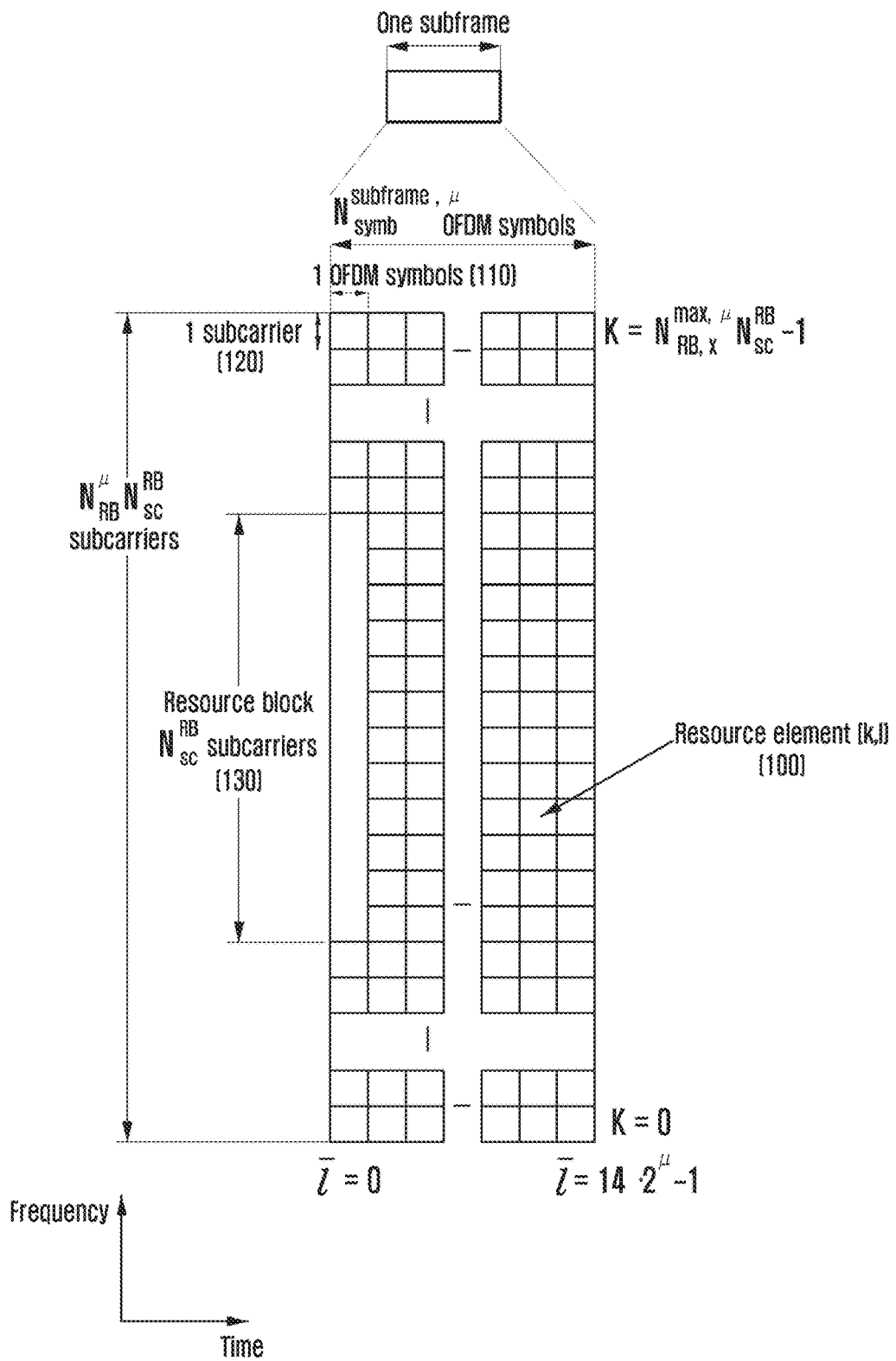
FIG. 1 illustrates a basic structure of a time-frequency domain, which is a radio resource domain in which data or a control channel of a 5G system is transmitted.

Hereinafter, embodiments of the disclosure will be described in detail with reference to the accompanying drawings.

In describing the embodiments, descriptions related to technical contents well-known in the art to which the disclosure pertains and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, according to some embodiments, the "unit" may include one or more processors.

Hereinafter, the operation principle of the technical idea of the disclosure will be described in detail with reference to the accompanying drawings. In the following description of the technical idea of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. In the following description of the disclosure, technology for receiving broadcast information from a base station by a terminal in a wireless communication system will be described. The disclosure relates to a communication technique for converging Internet of things (IoT) technology with 5th generation (5G) communication systems designed to support a higher data transfer rate beyond 4th generation (4G) systems, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

A wireless communication system is advancing to a broadband wireless communication system for providing high-speed and high-quality packet data services using communication standards, such as high-speed packet access (HSPA) of 3GPP, LTE {long-term evolution or evolved universal terrestrial radio access (E-UTRA)}, LTE-Advanced (LTE-A), LTE-Pro, high-rate packet data (HRPD) of 3GPP2, ultra-mobile broadband (UMB), IEEE 802.16e, and the like, as well as typical voice-based services.

As a typical example of the broadband wireless communication system, an LTE system employs an orthogonal frequency division multiplexing (OFDM) scheme in a downlink (DL) and employs a single carrier frequency division multiple access (SC-FDMA) scheme in an uplink (UL). The uplink indicates a radio link through which a user equipment (UE) {or a mobile station (MS)} transmits data or control signals to a base station (BS) (eNode B), and the downlink indicates a radio link through which the base station transmits data or control signals to the UE. The above multiple access scheme separates data or control information of respective users by allocating and operating time-frequency resources for transmitting the data or control information for each user so as to avoid overlapping each other, that is, so as to establish orthogonality.

Since a 5G communication system, which is a post-LTE communication system, must freely reflect various requirements of users, service providers, and the like, services satisfying various requirements must be supported. The services considered in the 5G communication system include enhanced mobile broadband (eMBB) communication, massive machine-type communication (mMTC), ultra-reliability low-latency communication (URLLC), and the like.

According to some embodiments, eMBB aims at providing a data rate higher than that supported by existing LTE, LTE-A, or LTE-Pro. For example, in the 5G communication system, eMBB must provide a peak data rate of 20 Gbps in the downlink and a peak data rate of 10 Gbps in the uplink for a single base station. Furthermore, the 5G communication system must provide an increased user-perceived data rate to the UE, as well as the maximum data rate. In order to satisfy such requirements, transmission/reception technologies including a further enhanced multi-input multi-output (MIMO) transmission technique are required to be improved. In addition, the data rate required for the 5G communication system may be obtained using a frequency bandwidth more than 20 MHz in a frequency band of 3 to 6 GHz or 6 GHz or more, instead of transmitting signals using a transmission bandwidth up to 20 MHz in a band of 2 GHz used in LTE.

In addition, mMTC is being considered to support application services such as the Internet of Things (IoT) in the 5G communication system. mMTC has requirements, such as support of connection of a large number of UEs in a cell, enhancement coverage of UEs, improved battery time, a reduction in the cost of a UE, and the like, in order to effectively provide the Internet of Things. Since the Internet of Things provides communication functions while being provided to various sensors and various devices, it must support a large number of UEs (e.g., 1,000,000 UEs/km2) in a cell. In addition, the UEs supporting mMTC may require wider coverage than those of other services provided by the 5G communication system because the UEs are likely to be located in a shadow area, such as a basement of a building, which is not covered by the cell due to the nature of the service. The UE supporting mMTC must be configured to be inexpensive, and may require a very long battery life-time because it is difficult to frequently replace the battery of the UE.

Lastly, URLLC, which is a cellular-based mission-critical wireless communication service, may be used for remote control for robots or machines, industrial automation, unmanned aerial vehicles, remote health care, emergency alert, and the like. Thus, URLLC must provide communication with ultra-low latency and ultra-high reliability. For example, a service supporting URLLC must satisfy an air interface latency of less than 0.5 ms, and also requires a packet error rate of 10-5 or less. Therefore, for the services supporting URLLC, a 5G system must provide a transmit time interval (TTI) shorter than those of other services, and also requires a design for assigning a large number of resources in a frequency band in order to secure reliability of a communication link. However, the above-described mMTC, URLLC, and eMBB are only examples of different types of services, and service types to which the disclosure is applicable are not limited to the above-described examples.

The above-described services considered in the 5G communication system must be converged with each other so as to be provided based on one framework. That is, the respective services are preferably integrated into a single system and controlled and transmitted in the integrated single system, instead of being operated independently, for efficient resource management and control.

Further, in the following description of embodiments of the disclosure, an LTE, LTE-A, LTE-Pro, or NR system will be described by way of example, but the embodiments of the disclosure may be applied to other communication systems having similar backgrounds or channel types. In addition, based on determinations by those skilled in the art, the embodiments of the disclosure may be applied to other communication systems through some modifications without significantly departing from the scope of the disclosure.

Hereinafter, the frame structure of the 5G system will be described in more detail with reference to the drawings.

FIG. 1 illustrates a basic structure of a time-frequency domain, which is a radio resource domain in which data or a control channel of a 5G system is transmitted.

Referring to FIG. 1, in FIG. 1, the horizontal axis represents a time domain, and the vertical axis represents a frequency domain. A basic unit of a resource in the time and frequency domain is a resource element (RE) 100 and may be defined as one OFDM symbol 110 on the time axis and one subcarrier 120 on the frequency axis. In the frequency domain, $N_{sc}^{RB}$ (for example, 12) consecutive REs may configure one resource block (RB) 130.

Figure 2:
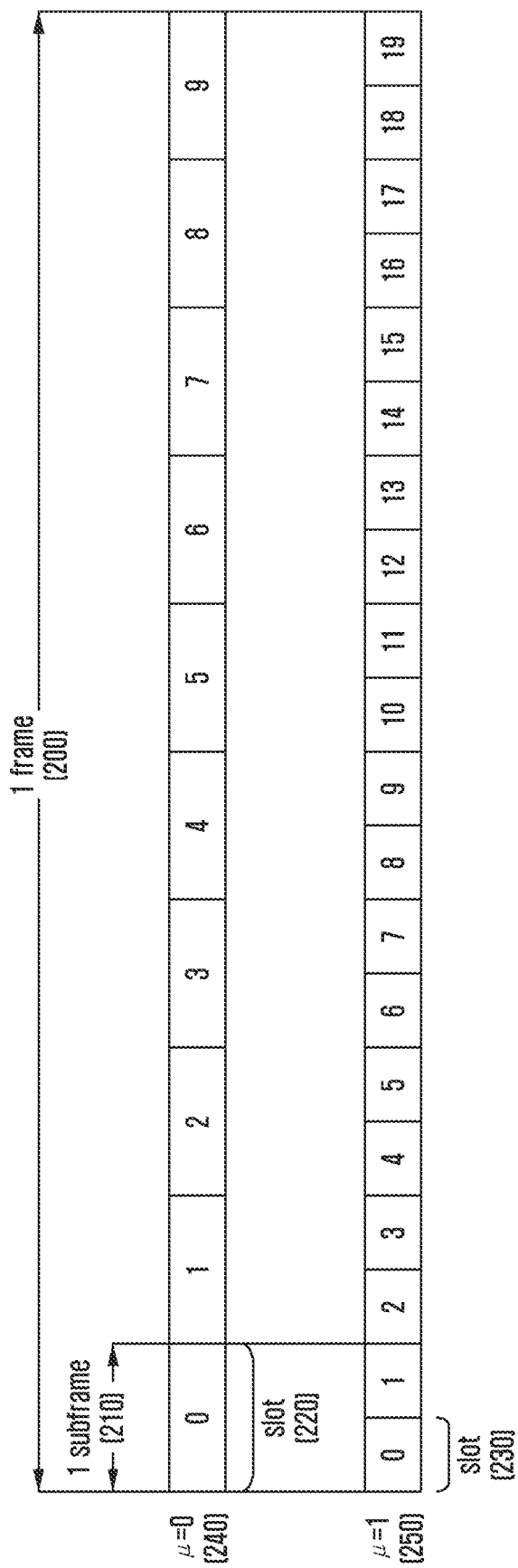
FIG. 2 illustrates the structure of a frame, a subframe, and a slot of a 5G system.

FIG. 2 illustrates the structure of a frame, a subframe, and a slot of a 5G system.

Referring to FIG. 2, an example of a structure of a frame 200, a subframe 210, and a slot 220 is illustrated in FIG. 2. One frame 200 may be defined as 10 ms. One subframe 210 may be defined as 1 ms, and one frame 200 may be configured by a total of 10 subframes 210. One slot 220 or 230 may be defined as 14 OFDM symbols (that is, the number of symbols per slot ($N_{symb}^{slot}$)=14). One subframe 210 may be configured by one or multiple slots 220 and 230, and the number of slots 220 and 230 per one subframe 210 may differ according to configuration value μ (240 or 250) for a subcarrier spacing.

In the example of FIG. 2, a case in which the subcarrier spacing configuration value is μ=0 (indicated by reference numeral 240) and μ=1 (indicated by reference numeral 250) is illustrated. In a case of μ=0 (indicated by reference numeral 240), one subframe 210 may include one slot 220, and in a case of μ=1 (indicated by reference numeral 250), one subframe 210 may include two slots 230. That is, the number of slots per one subframe ($N_{slot}^{subframe,\mu}$) may differ according to a subcarrier spacing configuration value μ, and accordingly, the number of slots per one frame ($N_{slot}^{frame,\mu}$) may differ. According to each subcarrier spacing configuration μ, $N_{slot}^{subframe,\mu}$ and $N_{slot}^{frame,\mu}$ may be defined as [Table 1] below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include up to 250 RBs or more. Therefore, when a UE always receives the entire serving cell bandwidth, such as in the LTE system, power consumption of the UE may be extreme, and in order to solve this problem, it is possible for a base station to configure one or more bandwidth parts (BWPs) for the UE so as to support the UE to change a reception area within a cell. In NR, the base station may configure an "initial BWP", which is a bandwidth of CORE-SET #0 (or common search space (CSS)), for the UE via a master information block (MIB). Thereafter, the base station may configure a first BWP of the UE via RRC signaling, and may notify of at least one BWP configuration information that can be indicated through downlink control information (DCI) in the future. Thereafter, the base station may notify of a BWP ID via DCI so as to indicate which band the UE is to use. If the UE fails to receive DCI in a currently allocated BWP for a specific period of time or more, the UE may return to a "default BWP" and attempt to receive DCI.

Next, downlink control information (DCI) in a 5G system will be described in detail.

In the 5G system, scheduling information about uplink data (or physical uplink shared channel (PUSCH)) or downlink data (or physical downlink shared channel (PDSCH)) is transmitted from a base station to a UE through DCI. The UE may monitor a fallback DCI format and a non-fallback DCI format with regard to the PUSCH or PDSCH. The fallback DCI format may include a fixed field predefined between the base station and the UE, and the non-fallback DCI format may include a configurable field.

The DCI may be transmitted through a PDCCH which is a physical downlink control channel after performing channel coding and modulation thereof. A cyclic redundancy check (CRC) may be attached to a DCI message payload, and the CRC may be scrambled by a radio network temporary identifier (RNTI) corresponding to the identity of the UE. Different RNTIs may be used according to the purpose of the DCI message, for example, a UE-specific data transmission, a power adjustment command, or a random access response. That is, the RNTI is not explicitly transmitted, but is included in a CRC calculation process and then transmitted. When receiving the DCI message transmitted through the PDCCH, the UE may check a CRC by using an assigned RNTI. When a CRC check result is correct, the UE may know that the corresponding message has been transmitted to the UE.

DCI format 1_0 may be used as a fallback DCI for scheduling a PDSCH. Here, a CRC may be scrambled by a C-RNTI. The DCI format 1_0 in which the CRC is scrambled by the C-RNTI may include, for example, the following pieces of information below.

TABLE 2

Identifier for DCI formats - [1] bit
Frequency domain resource assignment -
[⌈ log$_2$(N$_{RB}^{DL,BWP}$ (N$_{RB}^{DL,BWP}$ + 1)/2) ⌉] bits
Time domain resource assignment - 4 bits
VRB-to-PRB mapping - 1 bit
Modulation and coding scheme - 5 bits
New data indicator - 1 bit
Redundancy version - 2 bits
HARQ process number - 4 bits
Downlink assignment index - 2 bits
TPC command for scheduled PUCCH - [2] bits
PUCCH resource indicator (physical uplink control channel, PUCCH) resource indicator- 3 bits
PDSCH-to-HARQ feedback timing indicator - [3] bits DCI format 1_1 may be used as a non-fallback DCI for scheduling a PDSCH. Here, a CRC may be scrambled by a C-RNTI. The DCI format 1_1 in which the CRC is scrambled by the C-RNTI may include, for example, pieces of information below.

TABLE 3

Figure 3:
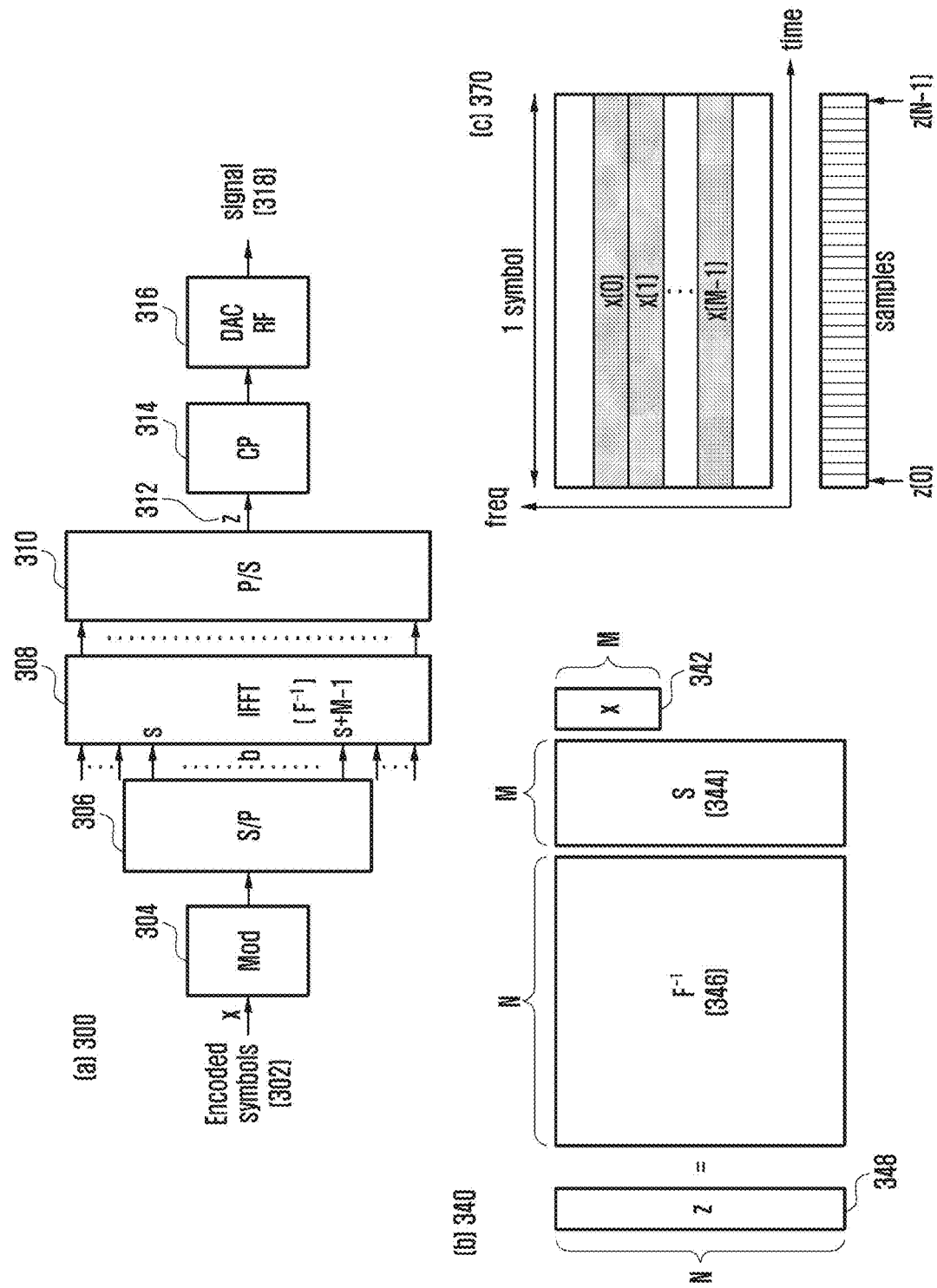
FIG. 3 illustrates a process of transmitting an OFDM signal in a 5G system.

Carrier indicator - 0 or 3 bits
Identifier for DCI formats - [1] bits
Bandwidth part indicator - 0, 1 or 2 bits
Frequency domain resource assignment
  ○ For resource allocation type 0, ⌈ N$_{RB}^{DL,BWP}$/P ⌉ bits
  ○ For resource allocation type 1, ⌈ log$_2$(N$_{RB}^{DL,BWP}$ (N$_{RB}^{DL,BWP}$ + 1)/2 ⌉ bits
Time domain resource assignment - 1, 2, 3, or 4 bits
VRB-to-PRB mapping - 0 or 1 bit, only for resource allocation type 1.
  ○ 0 bit if only resource allocation type 0 is configured;
  ○ 1 bit otherwise.
PRB bundling size indicator (Physical resource block bundling size indicator) - 0 or 1 bit
Rate matching indicator - 0, 1, or 2 bits
ZP CSI-RS trigger (Zero power channel state information reference signal trigger) - 0, 1, or 2 bits
For transport block 1:
Modulation and coding scheme - 5 bits
New data indicator - 1 bit
Redundancy version - 2 bits
For transport block 2:
Modulation and coding scheme - 5 bits
New data indicator - 1 bit
Redundancy version - 2 bits
HARQ process number - 4 bits
Downlink assignment index - 0 or 2 or 4 bits
TPC command for scheduled PUCCH - 2 bits
PUCCH resource indicator - 3 bits
PDSCH-to-HARQ_feedback timing indicator - 3 bits
Antenna ports - 4, 5 or 6 bits
Transmission configuration indication (TCI) - 0 or 3 bits
SRS request - 2 bits
CBG transmission information - 0, 2, 4, 6, or 8 bits
CBG flushing out information (Code block group flushing out information) - 0 or 1 bit
- DMRS sequence initialization - 1 bit FIG. 3 illustrates a transmission process of an OFDM signal in a 5G system. Referring to FIG. 3, "a 300" shows a method of transmitting an encoded symbol (or encoded bit) x 302. First, x is modulated through a modulator 304, and M modulated symbols are gathered and switched into a parallel signal through a serial-to-parallel converter (S/P) 306. When the switched M symbols are referred to as "b vector", the b vector is mapped to the desired s-th to (s+M−1)th subcarrier positions and then applied with inverse fast Fourier transform (IFFT) (indicated by reference numeral 308), so as to be converted into an OFDM signal. The generated N time samples are converted into serial time samples through a parallel-to-serial converter (P/S) 310, and are referred to as z vector 314. The z vector is concatenated with cyclic prefix (indicated by reference numeral 314) and then goes through a digital-to-analog converter (DAC) and radio frequency (RF) 316 so as to generate a signal 318.

Expressing the above process as an equation, a general OFDM signal such as "b 340" may be configured as follows, by using a signal model of the signal. Here, a transmission symbol may be called x 342, a mapper according to resource allocation may be called S matrix 344, an IFFT operation for generating the OFDM signal may be called $F^{-1}$-matrix 346, and an OFDM time symbol may be called z 348. This is expressed as Equation 1 below.

$$z = F^{-1}Sx \qquad \text{Equation 1}$$

Here, the m-th time sample z(m) which is actually transmitted is as shown in Equation 2 below.

$$z(m) = \sum_{l=0}^{M-1} x(l)w(l, m) \qquad \text{Equation 2}$$

and where l is an index of a modulation symbol, and m corresponds to an index of a time sample. Here, the mapper matrix S 344 is multiplied by columns of the $F^{-1}$ matrix from the sth column to the (s+M−1)th column, and this is understood as meaning that a signal is transmitted via the s-th to (s+M−1)th subcarriers among the total N (FFT size for OFDM) subcarriers. In the above case, when one OFDM symbol is transmitted as shown in "c 370", there is a disadvantage in that a signal cannot be generated until M symbols are prepared as shown in c 370. In other words, M symbols are required for one OFDM sample, and when generating an OFDM signal, there is a delay due to waiting until M symbols are generated.

Figure 4:
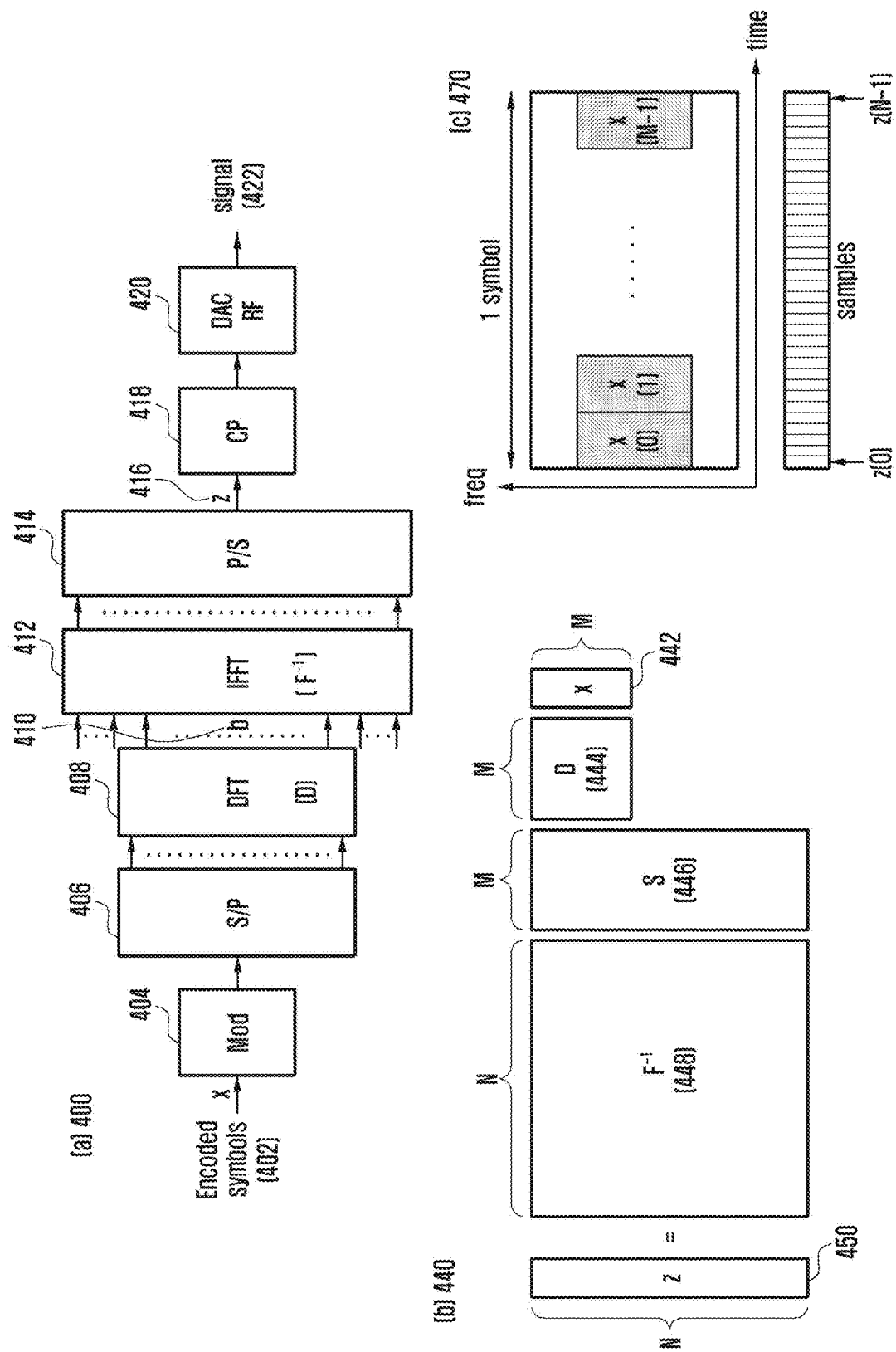
FIG. 4 illustrates a process of transmitting a single carrier using DFT-s-OFDM.

FIG. 4 illustrates a process of transmitting a single carrier using DFT-s-OFDM.

Referring to FIG. 4, "a 400" illustrates a method of transmitting an encoded symbol x 400. First, x is modulated through a modulator 404, and M modulated symbols are collected and switched into a parallel signal through a serial signal-to-parallel signal converter 406. When a signal obtained after preprocessing the switched M symbols by using discrete Fourier transform (DFT) 408 is called "b vector" 410, the b vector is mapped to the desired s-th to (s+M−1)th subcarrier positions and then applied with IFFT (indicated by reference numeral 412), so as to generate an OFDM signal. The generated N time samples are converted into serial time samples through a parallel-to-serial converter 414, and are referred to as a z vector 416. The z vector is concatenated with cyclic prefix (indicated by reference numeral 418) and then goes through a DAC and RF 420, so as to generate a signal 422.

Expressing this as an equation, a general DFT-s-OFDM-based single carrier signal such as "b 440" may be configured using a signal model of the signal, as follows. Here, the transmission symbol may be called x 442, a mapper according to resource allocation may be called S matrix 446, a DFT operation for generating a single carrier may be called D matrix 444, an IFFT operation for generating the OFDM signal may be called $F^{-1}$-matrix 448, and an OFDM time symbol may be called z 450. This is expressed as Equation 3 below.

$$z = F^{-1}SDx \qquad \text{Equation 3}$$

When performing transmission by using the above method, problems may occur as follows.
1. M symbols need to be collected in order to perform DFT
2. Processing delay occurs as the size of M symbols changes
3. N symbols need to be collected in order to perform IFFT
4. Delay due to S/P or P/S In the existing system, since the frequency or sampling rate is not high, this delay has no significant impact. However, in a system using a very high frequency band or in a system having a high sampling rate, the corresponding delay or processing delay may have a significant impact on overall performance.

Accordingly, the disclosure proposes a signal processing method for high-speed processing and a control channel for the same.

With regard to a DFT-s-OFDM-based single carrier signal, the m-th time sample z(m) is expressed in Equation 4 below.

$$z(m) = f(x(l))w(l,m) \qquad \text{Equation 4}$$

and where f( ) may be expressed as a time processing filter. In other words, referring to the m-th time sample, it may be seen that the N transmission time samples are sequentially transmitted, and thus high speed signal processing is possible even if all M modulation symbols are not gathered. The disclosure provides a method and an apparatus in which signal processing is possible by performing only time sample processing by a transmitter (e.g., a base station and/or a UE) in consideration of this characteristics, and according to the method, there is no procedure of processing a signal on the frequency axis, so as to enable high-speed signal processing.

Figure 5A:
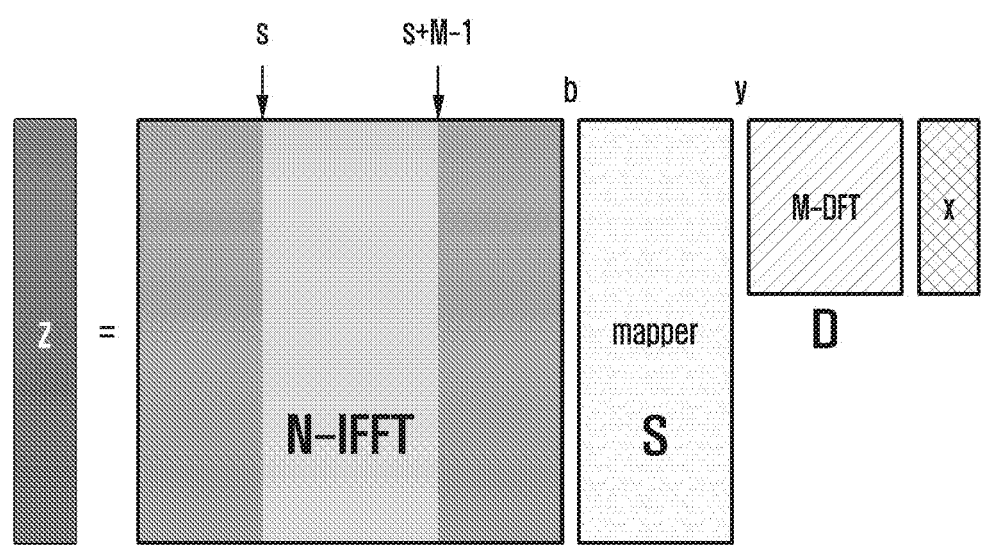
FIG. 5A illustrates a signal processing model in a case of transmitting a signal through a continuous frequency band.

The following describes a sample processing procedure for single carrier transmission by a transmitter. First, an example of transmitting a signal through a continuous frequency band will be described. FIG. 5A illustrates a signal processing model in a case of transmitting a signal through a continuous frequency band. In the following, "y" refers to a symbol after DFT precoding is performed on a modulation symbol x, and y is as shown in Equation 5 below.

$$y(n) = x(k)e^{-j2\pi nk/M} \qquad \text{Equation 5}$$

Here, M refers to the number of modulation symbols, k refers to an index of the modulation symbol, and n refers to an index of symbol y.

Here, when the M modulation symbols are mapped to the frequency positions of the s-th to the (s+M−1)th subcarriers, the transmitted m-th time sample z(m) is expressed by Equation 6 below.

$$z(m) = \frac{1}{N}\sum_{l=0}^{N} b(l)e^{j2\pi ml/N} = \frac{1}{N}\sum_{l=s}^{s+M-1} y(l-s)e^{j2\pi ml/N} \qquad \text{Equation 6}$$

Here, l refers to an index of a subcarrier, and N refers to an FFT size.

When explaining the above equation, it may be expressed in the form of a linear equation as shown in Equation 7 below.

$$\begin{aligned}
z(m) &= \frac{1}{N}\left(y(0)e^{j2\pi ms/N} + y(1)e^{j2\pi m(s+1)/N} + \ldots + y(M-1)e^{j2\pi m(s+M-1)/N}\right) \\
&= \frac{1}{N}e^{j2\pi ms/N}\left(y(0) + y(1)e^{j2\pi m(1)/N} + \ldots + y(M-1)e^{j2\pi m(M-1)/N}\right) \\
&= \frac{1}{N}e^{j2\pi ms/N}\left(x(k) + x(k)e^{-j2\pi k/M}e^{j2\pi m/N} + \ldots + x(k)e^{-j2\pi(M-1)k/M}e^{j2\pi m(M-1)/N}\right) \\
&= \frac{1}{N}x(k)e^{j2\pi ms/N}\left(1 + e^{-j2\pi k/M}e^{j2\pi m/N} + \ldots + e^{-j2\pi(M-1)k/M}e^{j2\pi m(M-1)/N}\right)
\end{aligned} \qquad \text{Equation 7}$$

$$= \frac{1}{N} x(\lfloor mM/N \rfloor) e^{j2\pi ms/N} \left(1 + e^{-j2\pi \lfloor mN/N \rfloor/M} e^{j2\pi m/N} + \ldots + e^{-j2\pi(M-1)\lfloor mM/N \rfloor} e^{j2\pi m(M-1)/N}\right)$$

With regard to the last equation, the transmitted time sample z may be expressed as sequentially transmitting the modulation symbol x, and may be described as Equation 8 below.

$$z(m) = x(\lfloor mM/N \rfloor) w(m) \text{ where} \quad \text{Equation 8}$$

$$w(m) = \frac{1}{N} e^{j2\pi ms/N} \left(1 + e^{-j2\pi \lfloor mM/N \rfloor/M} e^{j2\pi m/N} + \ldots + e^{-j2\pi(M-1)\lfloor mM/N \rfloor} e^{j2\pi m(M-1)/N}\right)$$

That is, the transmitted time sample z may be expressed in a form in which the modulation symbol x is multiplied by a weighting factor w(m). A weighting factor multiplied for each time sample m is called a time modulation coefficient. With regard to the time modulation coefficient, input variables are s, N, and M, where "s" is the starting point of the allocated frequency position, "N" is the FFT size for OFDM signal generation, and "M" may be the number of symbols to be transmitted or the DFT precoding size. That is, "s" is a factor related to scheduling in the frequency domain, and "N" is a factor that is inversely proportional to a subcarrier spacing.

With regard to the time modulation coefficient, the time modulation coefficient is classified into $$\frac{1}{N} e^{j2\pi ms/N} \text{ and}$$

$$\left(1 + e^{-j2\pi \lfloor mM/N \rfloor/M} e^{j2\pi m/N} + \ldots + e^{-j2\pi(M-1)\lfloor mM/N \rfloor/M} e^{j2\pi m(M-1)/N}\right).$$

It may be seen that the first modulation coefficient $$\frac{1}{N} e^{j2\pi ms/N}$$

is a function of N and S, and the second modulation coefficient $$\left(1 + e^{-j2\pi \lfloor mM/N \rfloor/M} e^{j2\pi m/N} + \ldots + e^{-j2\pi(M-1)\lfloor mM/N \rfloor/M} e^{j2\pi m(M-1)/N}\right)$$

is a function of M and N. Therefore, when all or a part of M, N, and s is preconfigured (this includes both cases in which the configuration is predetermined in a system or semi-statically configured), it may be seen that a transmitter may perform high speed signal processing by pre-storing w(m) according to at least one possible value among M, N, and s and applying the same during signal processing. In addition, in this case, since at least one possible value among M, N, and s is preconfigured, the amount of configuration information of a control channel is reduced and thus the reconstruction speed of the control channel can be increased.

Figure 5B:
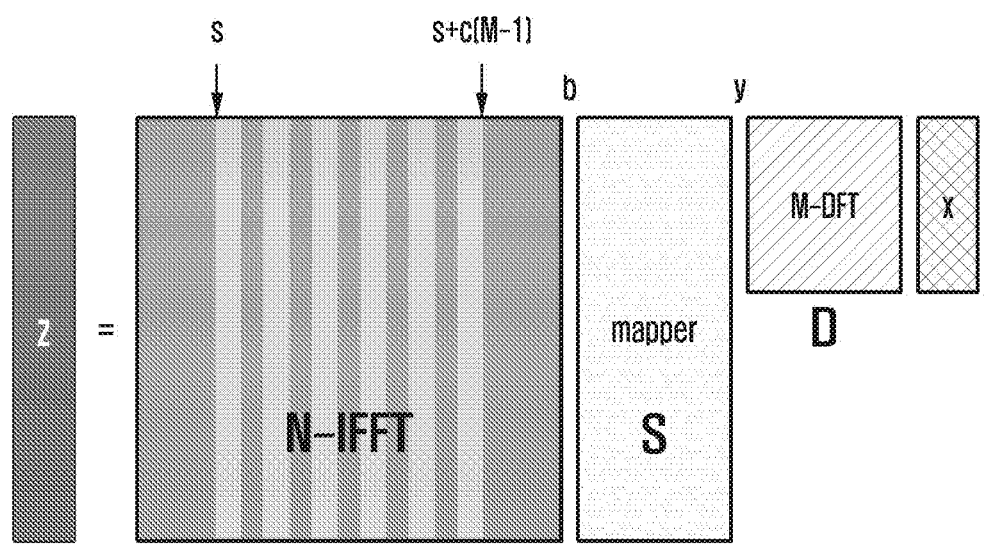
FIG. 5B illustrates a signal processing model in a case of transmitting a signal to equally-spaced subcarrier positions.

Second, an example of transmitting a signal to equally-spaced subcarrier positions will be described. FIG. 5B illustrates a signal processing model in a case of transmitting a signal to equally spaced subcarriers. In the following, y refers to a symbol after DFT precoding is performed on a modulation symbol x, and y is expressed in Equation 9 below. Here, c refers to a spacing between adjacent subcarriers.

$$y(n) = x(k) e^{-j2\pi nk}/M \quad \text{Equation 9}$$

Here, the m-th time sample z(m), which is transmitted when M modulation symbols are mapped to the frequency positions of the s-th to (s+M−1)th subcarriers at a spacing of c, is expressed by Equation 10 below.

$$z(m) = \frac{1}{N} \sum_{l=0}^{N} b(l) e^{j2\pi ml/N} \quad \text{Equation 10}$$

$$= \frac{1}{N} \sum_{l=0}^{s+M-1} y(l-s) e^{j2\pi mcl/N}$$

$$= \frac{1}{N} \left(y(0) e^{j2\pi mcs/N} + y(1) e^{j2\pi mc(s+1)/N} + \ldots + y(M-1) e^{j2\pi mc(s+M-1)/N}\right)$$

$$= \frac{1}{N} e^{j2\pi mcs/N} \left(y(0) + y(1) e^{j2\pi mc(1)/N} + \ldots + y(M-1) e^{j2\pi mc(M-1)/N}\right)$$

$$= \frac{1}{N} e^{j2\pi mcs/N} \left(x(k) + x(k) e^{-j2\pi k/M} e^{j2\pi mc/N} + \ldots + x(k) e^{-j2\pi(M-1)k/M} e^{j2\pi mc(M-1)/N}\right)$$

$$= \frac{1}{N} x(k) e^{j2\pi mcs/N0} \left(1 + e^{-j2\pi k/M} e^{j2\pi mc/N} + \ldots + e^{-j2\pi(M-1)k/M} e^{j2\pi mc(M-1)/N}\right)$$

$$= \frac{1}{N} x(\lfloor mcM/N \rfloor \bmod M) e^{j2\pi mcs/N} \left(1 + e^{-j2\pi \lfloor mcM/N \rfloor \bmod M/M} e^{j2\pi mcm/N} + \ldots + e^{-j2\pi(M-1)\lfloor mcM/N \rfloor \bmod M/M} e^{j2\pi mc(M-1)/N}\right)$$

With regard to the last equation, the transmitted time sample z may be expressed as sequentially transmitting the modulation symbol x, and may be described as Equation 11 below.

$$z(m) = x(\lfloor mcM/N \rfloor \bmod M)w(m) \text{ where} \qquad \text{Equation 11}$$

$$w(m) = \frac{1}{N}e^{j2\pi mcs/N}\left(1 + e^{-j2\pi \lfloor mcM/N \rfloor \bmod M/M}e^{j2\pi cm/N} + \right.$$

$$\left. \ldots + e^{-j2\pi(M-1)\lfloor mcM/N \rfloor \bmod M/M}e^{j2\pi mc(M-1)/N}\right)$$

As in the previous example, the transmitted time sample z may be expressed in a form in which a modulation symbol x is multiplied by a weighting factor w(m). If the weighting factor is a time modulation coefficient, it may be seen that the time modulation coefficients are expressed as the function of M, N, c and s.

Therefore, as in the first example, when all or a part of M, N, c, and s is preconfigured (this includes both cases in which the configuration is predetermined in a system or semi-statically configured), it may be seen that a transmitter may perform high speed signal processing by pre-storing w(m) according to at least one possible value among M, N, c, and s and applying the same during signal processing. In addition, in this case, since at least one possible value among M, N, and s is preconfigured, the amount of configuration information of a control channel is reduced and thus the reconstruction speed of the control channel can be increased.

This processing method is equally applicable to signal reception as well as signal transmission.

Figure 6:
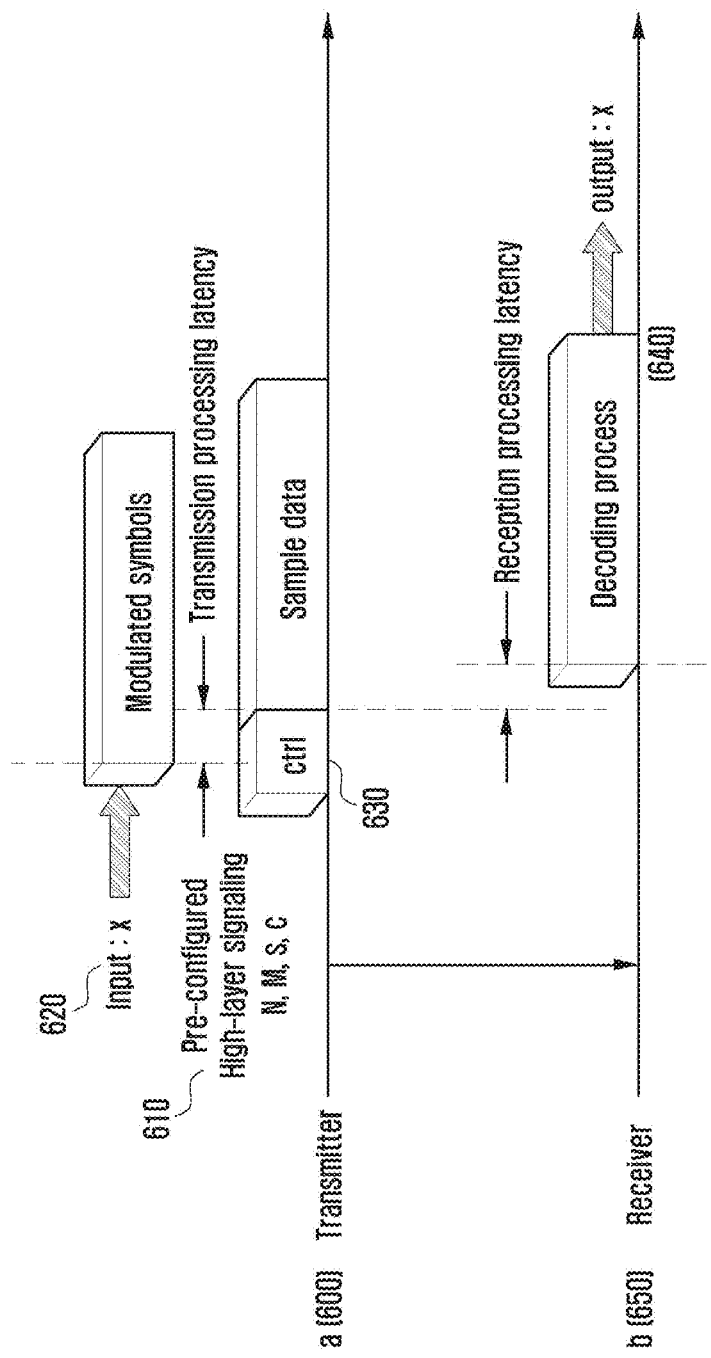
FIG. 6 illustrates an ultra-high-speed data processing method according to a first embodiment proposed by the disclosure.

FIG. 6 illustrates an ultra-high-speed data processing method according to a first embodiment proposed by the disclosure. The first embodiment is an example in which all parameters serves as input of a time modulation coefficient are preconfigured.

Referring to FIG. 6, "a 600" shows a signal processing procedure of a base station, and "b 650" shows a signal processing procedure of a UE. When the base station pre-configures N, M, s and c for a UE by using higher layer signaling (this may refer to at least one of RRC signaling, MIB, system information block (SIB), etc.) as shown in reference numeral 610, the base station and the UE may pre-calculate weighting factors based on the preconfigured information, and may store the calculated weighting factors in a memory. Thereafter, the base station transmits DCI for scheduling the data channel to the UE. here, since N, M, s, and c are pre-stored, the base station may configure a control channel (physical downlink control channel (PDCCH) or DCI) 630 before all pieces of data (or modulation symbols) generated by data generation as shown in reference numeral 620 arrive at a signal processor for channel coding, and at the same time as the configuration of control channel, the base station may generate a transmission signal (i.e., data sample) by processing signals in units of samples by using weighting factors pre-calculated in the order in which data arrives, and transmit the generated transmission signal to the UE.

Since the UE may know in advance N, M, s, and c, which determine most of the scheduling information (especially frequency domain resource allocation (FDRA) information) after receiving the control channel, signal reconstruction 640 using information pre-stored in the memory is possible. Here, since the control channel transmits at least time-domain resource allocation (TDRA) information, the amount of information may be reduced compared to a case where frequency domain resource allocation information and time domain resource allocation information are transmitted through the control channel, and fast control channel reception and data channel reconstruction are possible through the control channel. In addition, since a transceiver directly processes time samples, IFFT and FFT operations are not performed, thereby enabling faster signal processing.

Figure 7:
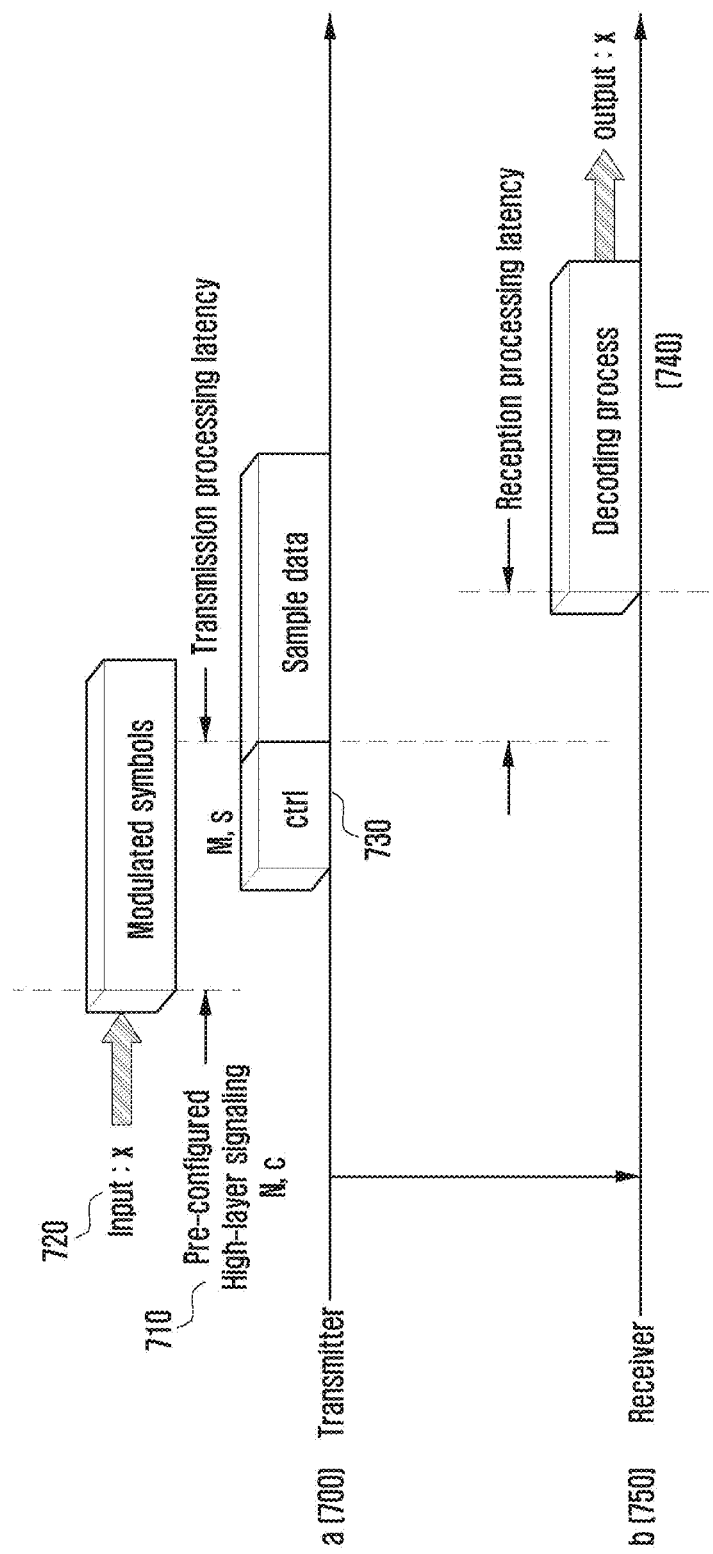
FIG. 7 illustrates a high-speed data processing method according to a second embodiment proposed by the disclosure.

FIG. 7 illustrates a high-speed data processing method according to a second embodiment proposed by the disclosure. The second embodiment is an example of preconfiguring a part of parameters serves as input of time modulation coefficients.

Referring to FIG. 7, "a 700" shows a signal processing procedure of a base station, and "b 750" shows a signal processing procedure of a UE. When the base station pre-configures some (for example, N, c) of the information of N, M, s, and c for the UE by using higher layer signaling as shown in reference numeral 610, the base station and the UE may pre-calculate possible weighting factors based on the preconfigured information, and may store the calculated weighting factors in a memory. As an example, the calculated weighting factor may be a value calculated by assuming possible M and s values based on configured N and c values. Thereafter, the base station transmits DCI for scheduling a data channel to the UE, and here, since N and c are pre-stored, data (or modulation symbols) is generated as shown in reference numeral 720, and the base station may configure a control channel 730 before all the generated data arrive at a signal processor for channel coding. In addition, at the same time as the configuration of control channel, the base station may generate a transmission signal (i.e., data sample) by processing signals in units of samples by using weighting factors pre-calculated in the order in which data arrives, and transmit the generated transmission signal to the UE.

Since the UE may know in advance N and c, which are part of the scheduling information, after receiving the control channel, signal reconstruction 740 using the information pre-stored in the memory is possible. Here, the control channel transmits a combination of at least TDRA information and at least one of M and s, through which fast control channel reception and data channel reconstruction are possible. In addition, since a transceiver directly processes time samples, IFFT and FFT operations are not performed, thereby enabling faster signal processing.

In addition, preconfiguring N and c in the second embodiment is only an example, and at least one information among M, N, s, and c may be configured for the UE by using higher layer signaling.

Figure 8:
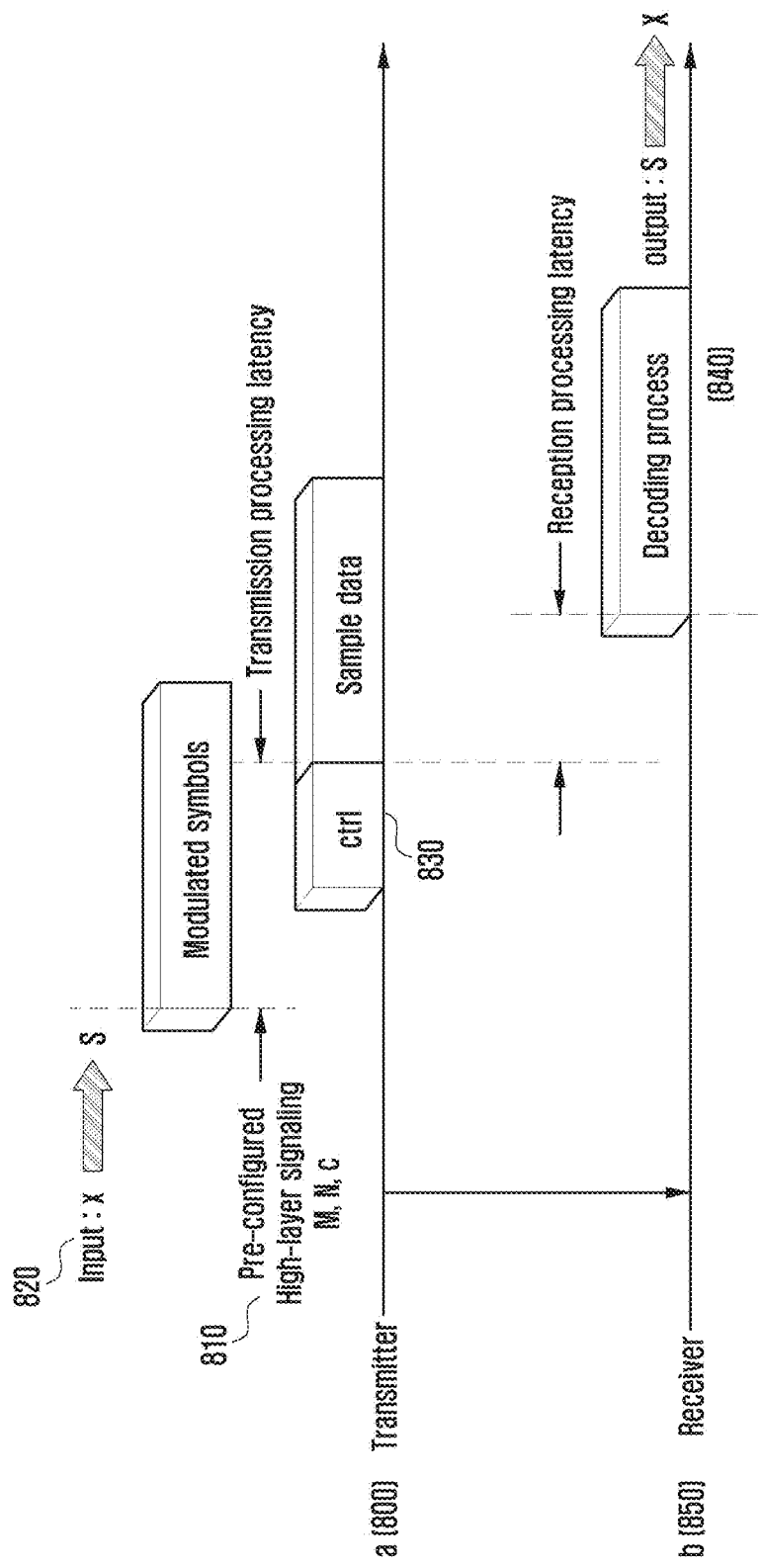
FIG. 8 illustrates a high-speed data processing method of a low-cost UE according to a third embodiment proposed by the disclosure.

FIG. 8 illustrates a high-speed data processing method of a low-cost UE according to a third embodiment proposed by the disclosure.

Referring to FIG. 8, "a 800" shows a signal processing procedure of a base station, and "b 850" shows a signal processing procedure of a UE. When the base station pre-configures at least one of the information of N, M, s, and c by using higher layer signaling as shown in reference numeral 810, the base station and the UE may pre-calculate weighting factors based on the preconfigured information, and may store the calculated weighting factors in a memory. Thereafter, the base station transmits DCI for scheduling a data channel to the UE, and here, since at least one of M, N, and c is pre-stored, data (or modulation symbols) is generated as shown in reference numeral 820, the base station may configure a control channel 830 before all pieces of data generated by data generation as shown in reference numeral 820 arrive at a signal processor for channel coding, and at the same time as the configuration of control channel, the base station may generate a transmission signal (i.e., data sample) by processing signals in units of samples by using weighting factors pre-calculated in the order in which data arrives, and transmit the generated transmission signal to the UE.

Here, the base station uses a method of configuring and transmitting "s" (that is, frequency allocation) corresponding to "x" instead of the modulation symbol (or information to be transmitted) x. A method of configuring "s" instead of "x" is determined through a rule using information previously exchanged between the base station and the UE. The base station and the UE may convert the information "x" to be transmitted by the base station into the assigned frequency index (or location) "s" through the above rule, or vice versa. That is, the base station may map a predetermined signal to the location of "s" corresponding to the information "x" to be transmitted, and the UE may identify the information to be transmitted by the base station by identifying the location "s" of the signal.

Since the UE may know in advance at least one of M, N, and c, which determine most of the scheduling information, after receiving the control channel, signal reconstruction 840 using the information pre-stored in the memory is possible. Here, the control channel transmits one of at least TDRA information and/or M or a combination thereof, through which fast control channel reception and data channel reconstruction are possible. In a case of the data channel, the UE reconstructs "s", which is the frequency position of a signal, which is transmitted instead of x, and the UE acquires "x" based on "s" derived for each sample or group sample. According to the above example, there is an advantage that a low-cost UE does not need to use a device for quickly processing IFFT and FFT. In addition, since a transceiver directly processes time samples, IFFT and FFT operations are not performed, thereby enabling faster signal processing.

Figure 9:
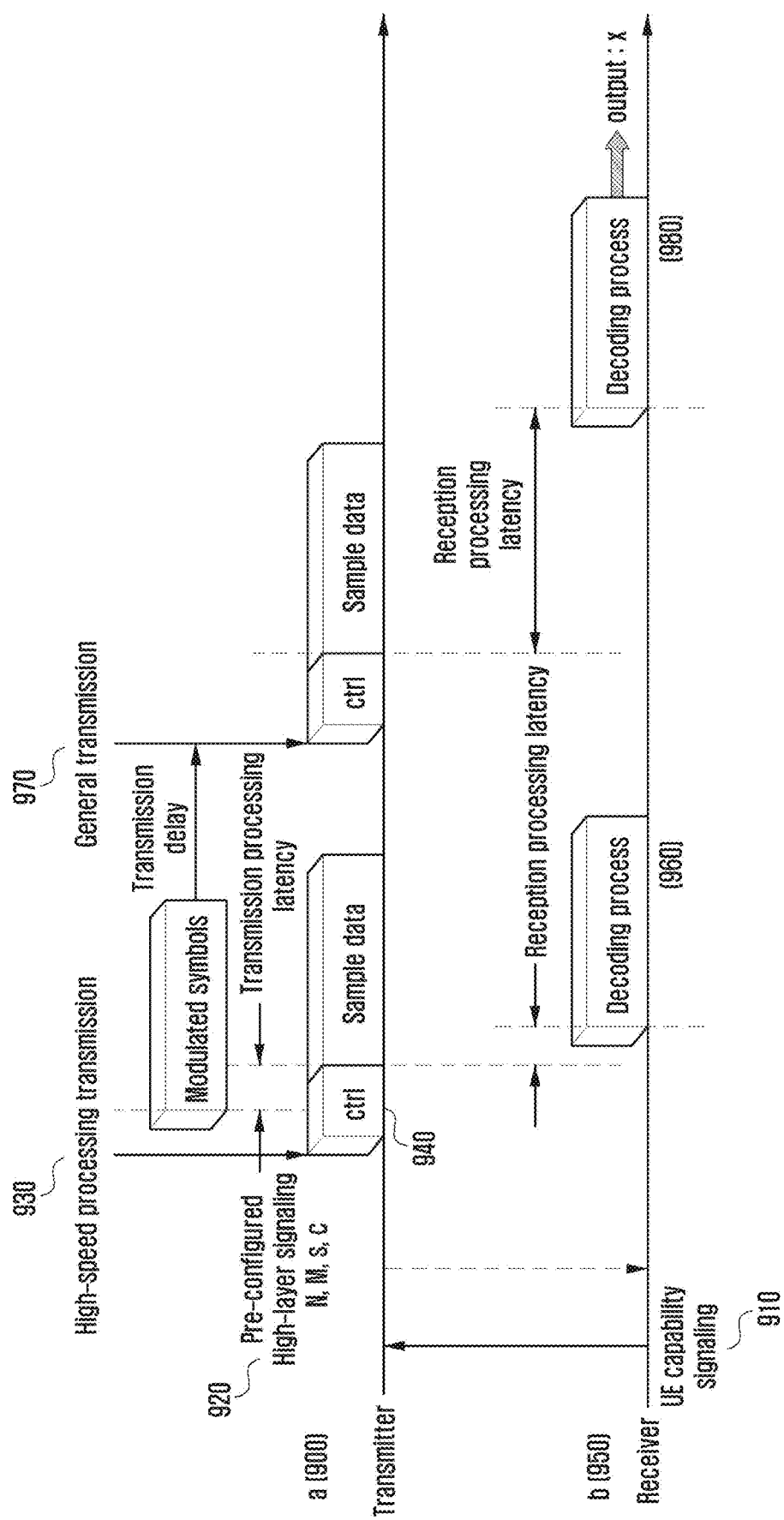
FIG. 9 illustrates a selective high-speed processing method according to UE capability according to a fourth embodiment proposed by the disclosure.

FIG. 9 illustrates a selective high-speed processing method according to UE capability according to a fourth embodiment proposed by the disclosure.

Referring to FIG. 9, "a 900" shows a signal processing procedure of a base station, and "b 950" shows a signal processing procedure of a UE. The UE may transmit, to the base station, information related to at least one of whether high-speed signal processing is possible, whether time domain signal processing is possible, whether time and frequency domain signal processing is possible, or whether frequency domain processing is not possible, during initial access as shown in reference numeral 910. The information may be transmitted to the base station through UE capability information.

Here, the UE capability information may include at least one, for example, of information on the maximum processing time according to each channel or whether M, N, c, and s are variable, and information on the minimum buffering time according to each channel or whether M, N, c, and s are variable, information on whether on-the-fly decoding is possible, and/or information on which parameters among M, N, c, s is allowed to be fixed or varied.

In a case of a UE to which the method proposed in the disclosure is applicable according to the above information, the base station is configured to perform high-speed processing and transmit data as shown in reference numeral 930, and otherwise, the base station is configured to perform low-speed processing and transmit data as shown in reference numeral 940. That is, in case of reference numeral 930, the base station may preconfigure at least one information of N, M, s, and c for the UE via higher layer signaling, may pre-calculate a weighting factor according to the configured information, and then when data (or modulation symbol) to be transmitted arrives at a signal processor, may reduce a delay by processing the data simultaneously with the configuration of the control channel 940 by considering the processing speed limit according to the UE capability. In this case, DCI transmitted through the control channel may include at least one of TDRA information and non-configured information among N, M, s, and c. In contrast, in case of reference numeral 940, the base station performs signal processing when all data (or modulation symbols) to be transmitted arrive at the signal processor. The method proposed in the disclosure configures different requirements for data processing delay according to the processing capability of the UE.

Figure 10:
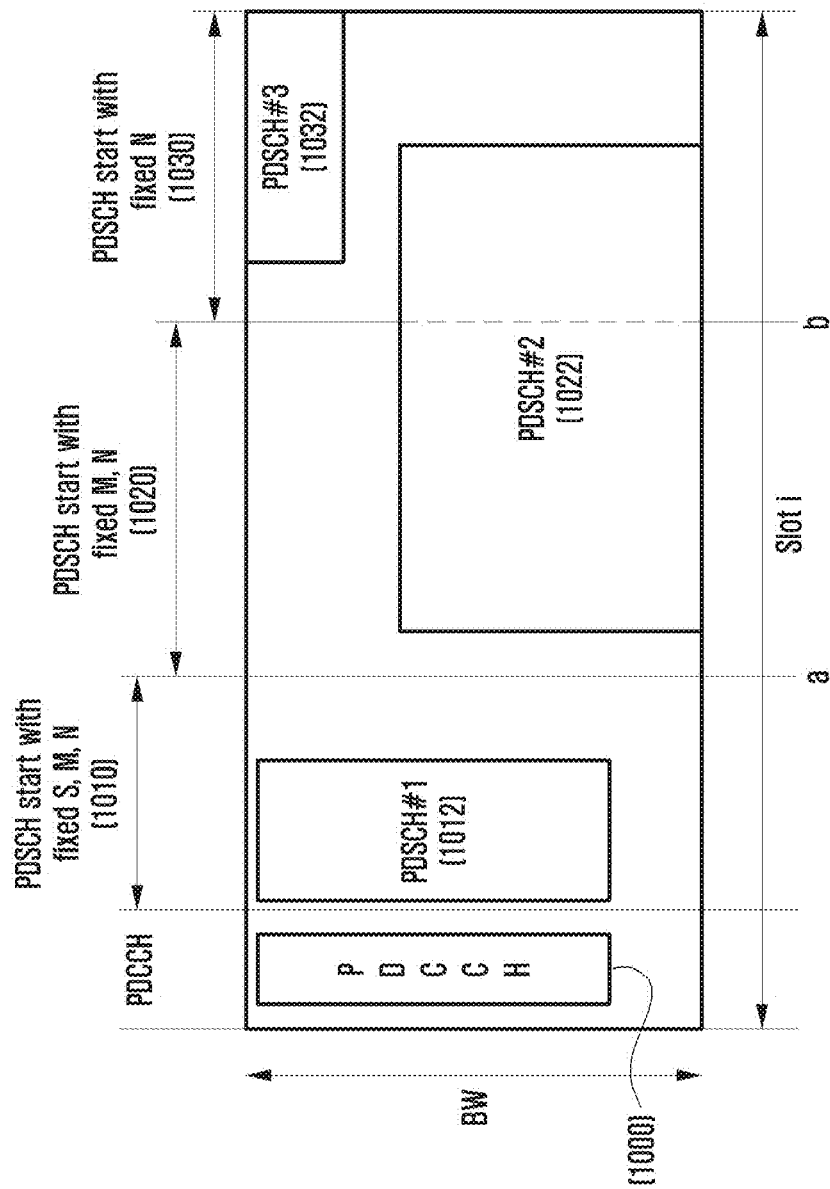
FIG. 10 illustrates a selective high-speed processing method according to time scheduling resource configuration information according to a fifth embodiment proposed by the disclosure.

FIG. 10 illustrates a selective high-speed processing method according to time scheduling resource configuration information according to a fifth embodiment proposed by the disclosure.

Referring to FIG. 10, the method proposed by the disclosure corresponds to a method of applying different processing requirements according to a start symbol of TDRA information among control information of DCI. When a control channel 1000 is received within a bandwidth, a UE may reconstruct TDRA information from the control channel information, and when the index of the start symbol of the reconstructed TDRA information is "x", the UE may use a value (i.e., a weighting factor) pre-stored in the memory according to the following method for fast signal processing. In addition, the base station may also generate a transmission signal by using a pre-stored value according to the following method. Here, "a" and "b" may be understood as values described in the standard or threshold values configured through higher layer signaling. The "a" or "b" may be a value indicating a specific time point.

i) x<a (indicated by reference numeral 1010): s, M, and N use preconfigured values. Here, PDSCH to be allocated may be shown as reference numeral 1012. This is because, when x has a value before "a", ultra-fast data processing may be required. This may be understood as meaning that the frequency domain resource allocation is predetermined. In this case, the frequency domain resource allocation of data may optionally be the same as the frequency domain resource allocation of the control channel.

ii) a≤x<b (indicated by reference numeral 1020): M and N use preconfigured values. Here, the PDSCH to be allocated may be shown as reference numeral 1022. When "x" has a value between a and b, fixed values of M and N may be used for high-speed data processing.

iii) b≤x (indicated by reference numeral 1030): N uses a preconfigured value. Here, the PDSCH to be allocated may be shown as reference numeral 1032. In this case, the degree of freedom of scheduling in the frequency domain may be high. That is, DCI may indicate resource allocation information for data transmission in time and frequency domains.

If a single DCI format is to be used, in case of reference numeral 1010, DCI may include only TDRA information as resource allocation information and may not include FDRA information. In case of reference numeral 1020, DCI may include TDRA information and FDRA information indicating a start point of frequency resource allocation (e.g., index of the lowest physical resource block (PRB)). In case of reference numeral 1030, DCI may include TDRA information and FDRA information indicating a start point of frequency resource allocation and a length of frequency resource allocation (e.g., M, which is a DFT size).

If multiple DCI formats are included, the first format includes only TDRA information as resource allocation information and may be used in case of reference numeral 1010. The second format may include TDRA information and FDRA information indicating a start point of frequency resource allocation as resource allocation information, and may be used in case of reference numeral 1020. The third format may include TDRA information and FDRA information indicating a start point of frequency resource allocation and a length of frequency resource allocation (e.g., M, which is a DFT size), and may be used in case of reference numeral 1030. Whether to use the first, second, and/or third formats may be indicated to the UE via higher layer signaling, respectively.

In addition, if the PDCCH is detected within the first one to second symbols of a slot, it is possible to enable immediate data signal processing using predetermined M, N and s. In addition, the UE needs to perform blind decoding of multiple DCI formats. In case that cross-slot scheduling (a slot in which control information is transmitted and a slot in which data is scheduled are different) is not used, if the PDCCH is detected in the 8th to 10th symbols of the slot, the DCI of the first format is used or the DCI may include only TDRA information as resource allocation information.

In addition, a predefined format may be applied in order to perform fast processing. For example, when the value of N is preconfigured such that N=dM, the scheduling offset (interval between PDCCH and PDSCH) may be 0 (or 0 symbols). Otherwise, the scheduling offset may be increased.

In addition, a combination of at least one of the following methods may be used together with the disclosed method.

The DCI may include TDRA information. The TDRA information is information indicating a resource allocated in the time domain, and may be a combination of at least one information among information indicating a time resource such as a start point of resource allocation (at least one of information such as a resource allocation time in a symbol when resources are allocated from an intermediate point of a start slot, a start symbol, or a specific symbol), a length of an allocated resource, an end point of resource allocation (this information may be similar to information on a start point of resource allocation), a pattern of resource allocation, and a period of resource allocation in a case of periodic resource allocation.

Alternatively, one or more TDRA information may be preconfigured via higher layer signaling, and the DCI may include an indicator indicating one or more TDRA information among the multiple preconfigured TDRA information. Alternatively, some of the information configuring the TDRA information may be configured via higher layer signaling, and the rest of the information may be included in the DCI.

In addition, based on the positions of the start symbol and the end symbol of the PDSCH indicated by the TDRA information, the UE may be configured with whether to use preconfigured information among the N, M, s, and c through higher layer signaling. For example, when the start symbol is 1 or 2 in the slot, preconfigured N, M, s, and c may be used.

In addition, multiple combinations of at least one of N, M, s, and c may be preconfigured via higher layer signaling, and in this case, the base station and the UE may calculate and store a weighting factor in advance according to the configured combination. The base station may determine to use one of the multiple configured combinations, may indicate the determined combination to the UE through higher layer signaling or DCI, and may perform signal processing by using a weighting factor according to the determined combination during signal processing. The UE may identify the weighting factor to be applied according to the combination indicated by the base station and apply the identified weighting factor during signal processing.

In addition, when transmitting a signal through a continuous frequency band according to FIG. 5A, only M, N, and s described above may be used. The M, N, s, and c described above may be used when a signal is transmitted to equally spaced frequency resources (e.g., equally-spaced subcarrier positions) according to FIG. 5B.

According to the disclosure, scheduling information may be transmitted differently according to a processing level with respect to one or more scheduling parameters for fast signal generation, transmission, scheduling, reception, and/or reconstruction using a single carrier. According to the disclosure, faster signal processing compared to the existing signal processing method is possible, and the base station and the UE may pre-store, in the memory of the base station or the UE, a value for single carrier generation according to a signal processing level, thereby enabling high-speed signal transmission and reception signal processing between the base station and the UE.

Figure 11A:
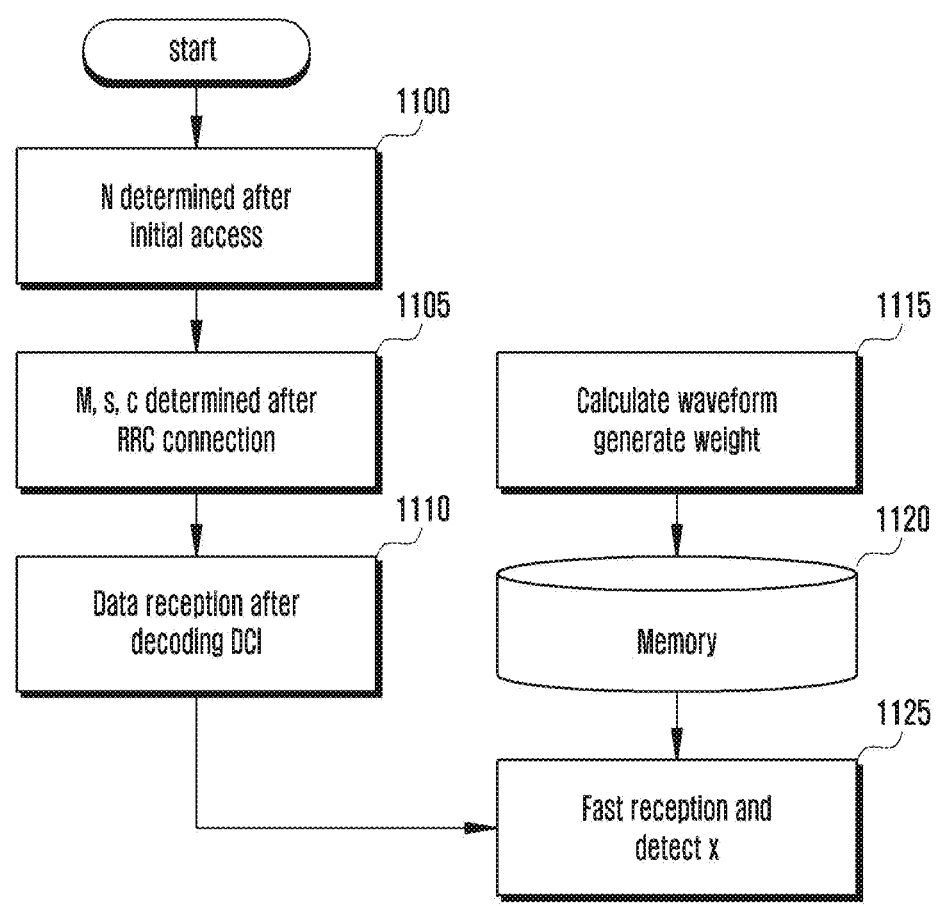
FIG. 11A illustrates an operation of a UE for an embodiment corresponding to a case in which overall configuration information is preconfigured via higher layer signaling in order to perform ultra-high-speed signal processing.
Figure 11B:
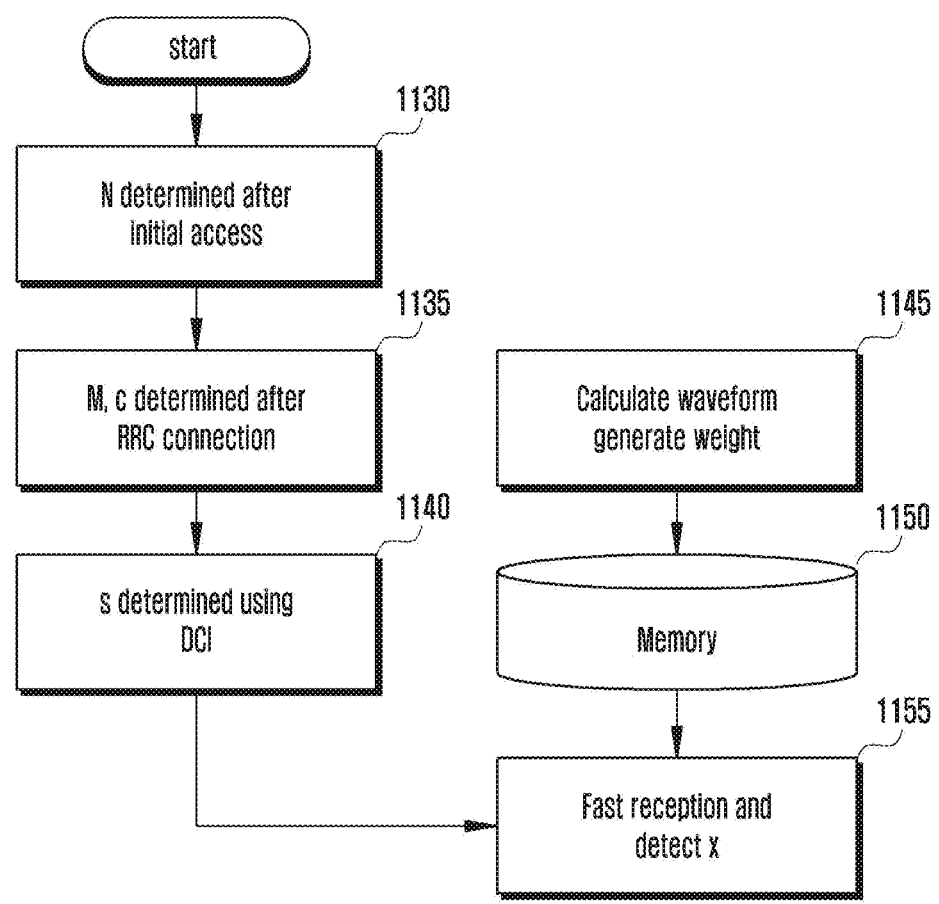
FIG. 11B illustrates an operation of a UE for an embodiment corresponding to a case in which partial configuration information is preconfigured via higher layer signaling in order to perform fast processing.
Figure 11C:
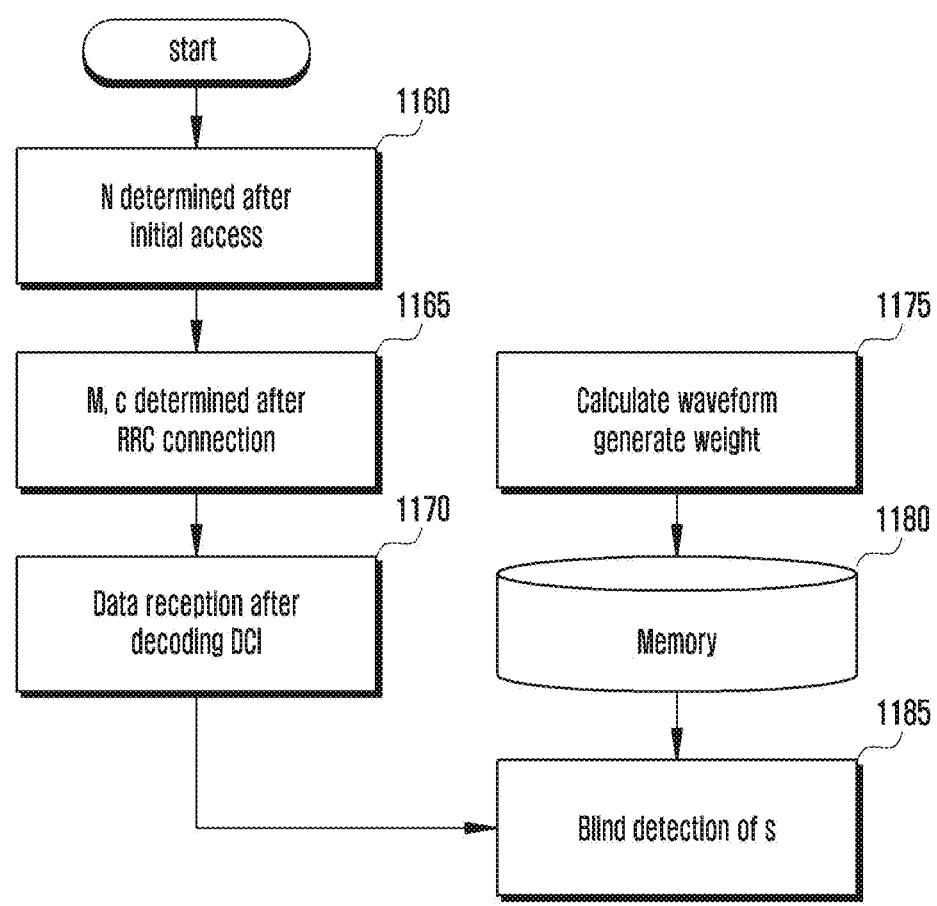
FIG. 11C illustrates an operation of a UE for an embodiment corresponding to a case in which partial configuration information is preconfigured via higher layer signaling in order to perform fast processing of a low-cost UE.

FIGS. 11A, 11B, and 11C are flowcharts illustrating operations of a UE according to an embodiment of the disclosure.

FIG. 11A illustrates an operation of a UE for an embodiment corresponding to a case in which overall configuration information is preconfigured via higher layer signaling in order to perform ultra-high-speed signal processing.

Referring to FIG. 11A, in operation 1100, the UE is configured with a predetermined N according to a frequency band to frequency size or a channel size to be used (after initial access). Thereafter, in operation 1105, the UE is configured with N, M, s, and c information, which is information for a fast scheduling process proposed in the disclosure, after being connected to a base station using higher layer signaling. The UE may receive all or part of the above-described information depending on its use. In this case, the undelivered information may be predetermined in the standard or may be determined by the type of the UE, the service provided by the UE, or the like. Thereafter, in operation 1115, the UE calculates a weighting factor (or waveform generation weight) for preprocessing a sample for fast data processing based on the information received from the base station and stores the calculated weighting factor in a memory 1120. Thereafter, the UE receives TDRA information (for example, location information of a symbol in which data allocation starts and a symbol in which data allocation ends) among data transmission information through DCI in operation 1110, and receives a data sample and reconstructs the data sample by using the information stored in the memory 1120 for fast data processing in operation 1125.

FIG. 11B illustrates an operation of a UE for an embodiment corresponding to a case in which partial configuration information is preconfigured via higher layer signaling in order to perform fast processing.

Referring to FIG. 11B, in operation 1130, the UE is configured with a predetermined N according to a frequency band to frequency size or a channel size to be used (after initial access). Thereafter, in operation 1135, the UE receives N and c information (this may be referred to as a first information group), which is information for a fast scheduling process proposed by the disclosure, by using higher layer signaling. In addition, in the disclosure, all or part of the above-described information may be transmitted depending on its use. In this case, the undelivered information may be predetermined in the standard or may be determined by the type of the UE, the service provided by the UE, or the like. Thereafter, in operation 1145, the UE calculates a weighting factor for preprocessing the sample for fast data processing based on the information received from the base station and stores the calculated weighting factor in the memory 1150. Thereafter, the UE receives TDRA information (for example, location information of a symbol in which data allocation starts and a symbol in which data allocation ends) and/or M and s information (second information group) among data transmission information, through DCI including the TDRA information and the M and s information, in operation 1140. The UE receives and reconstructs a data sample using information stored in the memory 1150 for fast data processing in operation 1155. Here, items included in the first information group and the second information group, which are information groups for data scheduling, may include a combination of all or part of the information described in the proposed disclosure.

FIG. 11C illustrates an operation of a UE for an embodiment in which partial configuration information is preconfigured as higher layer signaling in order to perform fast processing of a low-cost UE.

Referring to FIG. 11C, in operation 1160, the UE is configured with a predetermined N according to a used frequency band to frequency size and channel size. Thereafter, in operation 1165, the UE is configured with N and c information (first information group), which is information for the fast scheduling process proposed by the disclosure, by using higher layer signaling. The UE may receive all or part of the above-described information depending on its use. In this case, the undelivered information may be predetermined in the standard or may be determined by the type of the UE, the service provided by the UE, or the like. Thereafter, in operation 1175, the UE calculates a weighting factor for preprocessing the sample for fast data processing based on the information received from the base station and stores the calculated weighting factor in a memory 1180. Thereafter, the UE receives TDRA information (location information of a symbol in which data allocation starts and a symbol in which data allocation ends) and/or M information (second information group) among data transmission information through DCI in operation 1170. In operation 1185, for fast data processing, the UE receives data and reconstructs "s" by using the information stored in the memory 1180, thereby reconstructing the symbol x. Here, items included in the first information group and the second information group, which are information groups for data scheduling, may include a combination of all or part of the information described in the proposed disclosure.

All operations of the UE shown in FIGS. 11A, 11B and 11C do not necessarily have to be performed, and some operations may be omitted or operations not shown in the drawings may be added and performed. In addition, it is also possible that the operation of the UE is changed and performed differently from the order shown in the figure.

Figure 12A:
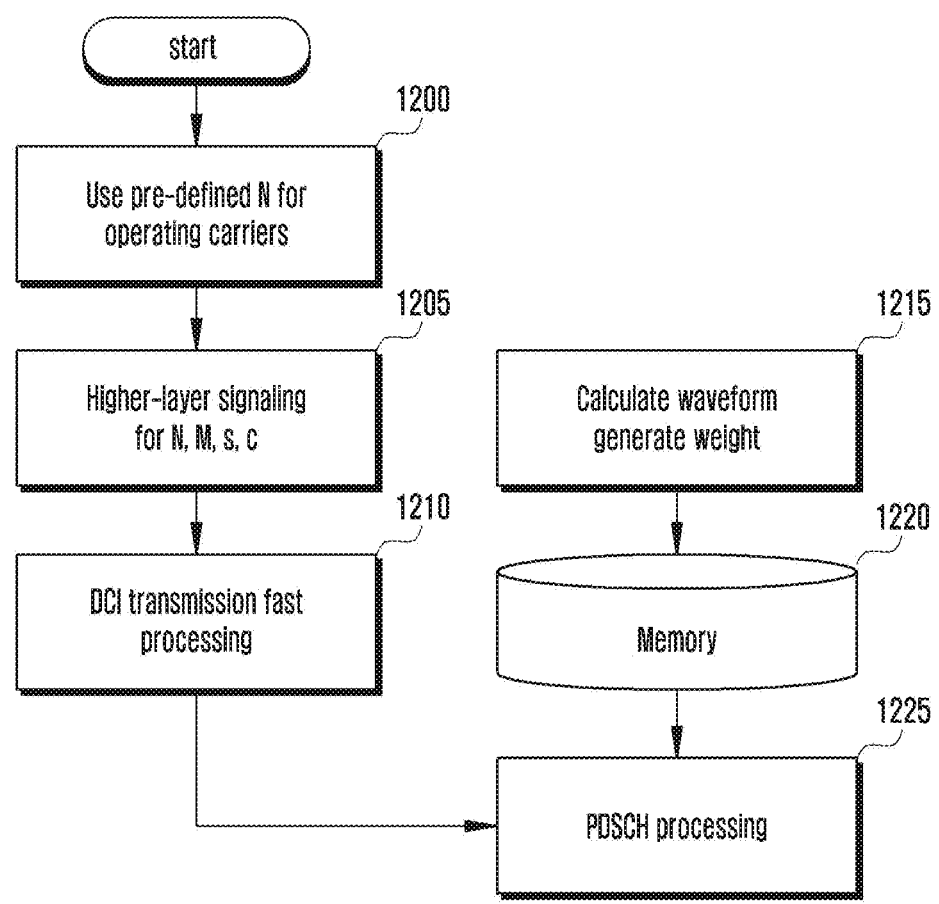
FIG. 12A illustrates an operation of a base station for an embodiment corresponding to a case in which overall configuration information is preconfigured via higher layer signaling in order to perform ultra-high-speed signal processing.
Figure 12B:
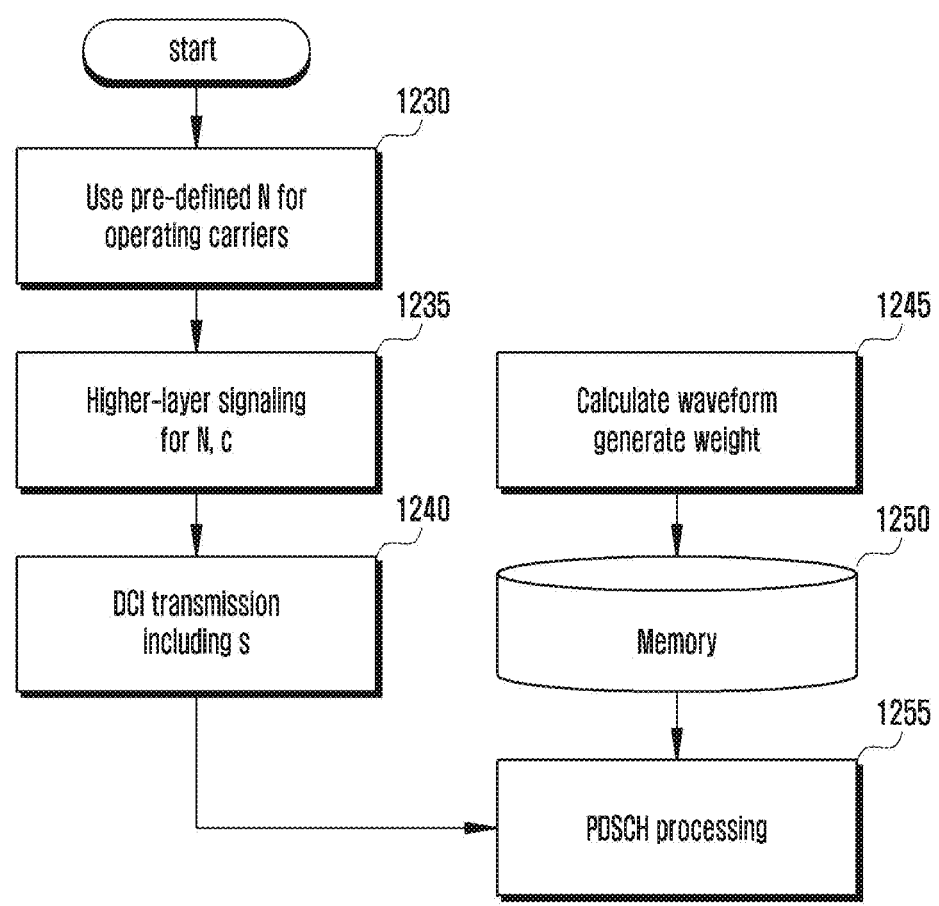
FIG. 12B illustrates an operation of a base station for an embodiment corresponding to a case in which partial configuration information is preconfigured via higher layer signaling in order to perform fast processing.
Figure 12C:
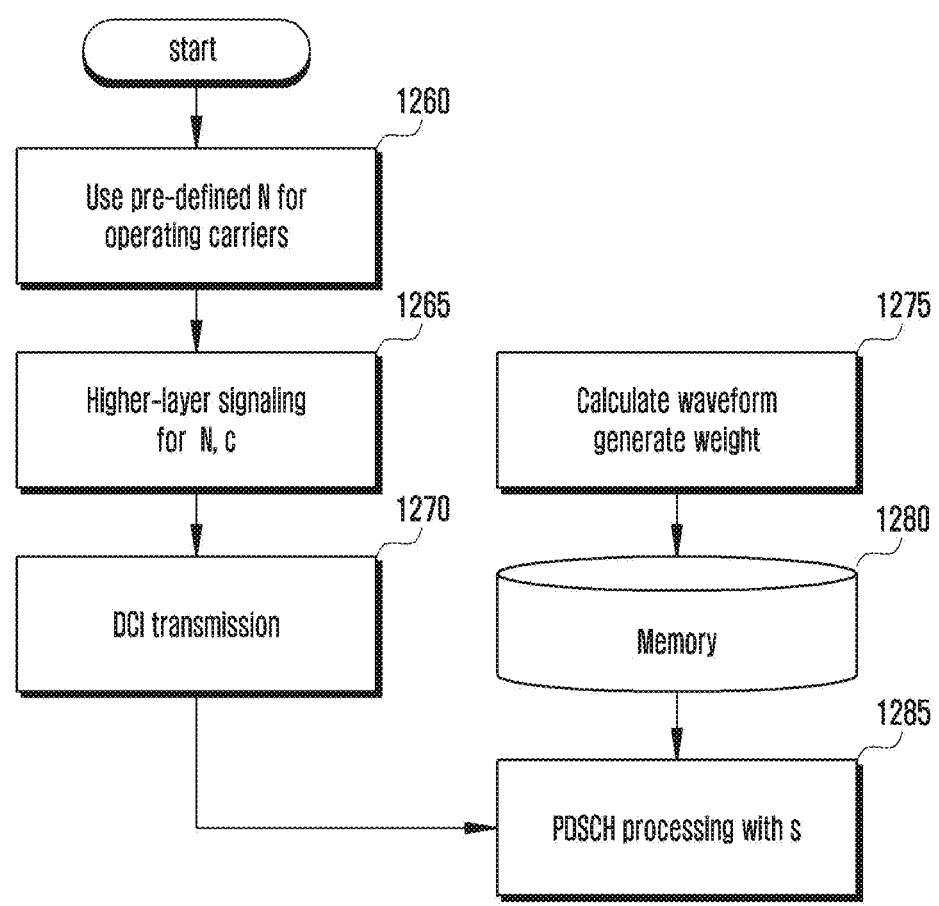
FIG. 12C illustrates an operation of a base station for an embodiment corresponding to a case in which partial configuration information is preconfigured via higher signaling in order to perform fast processing of a low-cost UE.

FIGS. 12A, 12B, and 12C are flowcharts illustrating operations of a base station according to an embodiment of the disclosure.

FIG. 12A illustrates an operation of a base station for an embodiment corresponding to a case in which overall configuration information is preconfigured via higher layer signaling in order to perform ultra-high-speed signal processing.

Referring to FIG. 12A, in operation 1200, the base station is configured to use a predetermined N according to a frequency band to frequency size or a channel size to be used. Thereafter, in operation 1205, the base station transmits N, M, s, and c information, which is information for a fast scheduling process proposed in the disclosure, to a UE by using higher layer signaling. The base station may transmit all or part of the above-described information depending on its use. In this case, the undelivered information may be predetermined in the standard or may be determined by the type of the UE, the service provided by the UE, or the like. Thereafter, in operation 1215, the base station calculates a weighting factor for pre-generating samples for fast data processing based on the information having transmitted to the UE and stores the calculated weighting factor in the memory 1220. Thereafter, the base station transmits TDRA information (e.g., location information of a symbol in which data allocation starts and a symbol at which data allocation ends) among data transmission information through DCI in operation 1210. In operation 1225, the base station generates data samples using information stored in the memory 1120 for fast data processing and transmits the data samples to the UE.

FIG. 12B illustrates an operation of a base station for an embodiment corresponding to a case in which partial configuration information is preconfigured via higher layer signaling in order to perform fast processing.

Referring to FIG. 12B, in operation 1230, the base station is configured to use a predetermined N according to a frequency band to frequency size or a channel size to be used. Thereafter, in operation 1235, the base station transmits N and c information (this may be referred to as a first information group), which is information for a fast scheduling process proposed in the disclosure, to the UE by using higher layer signaling. In the disclosure, the base station may transmit all or part of the above-described information depending on its use. In this case, the undelivered information may be predetermined in the standard or may be determined by the type of the UE, the service provided by the UE, or the like. Thereafter, in operation 1245, the base station calculates a weighting factor for pre-generating a sample for fast data processing based on the information having transmitted to the UE and stores the calculated weighting factor in the memory 1250. Thereafter, the base station transmits TDRA information (e.g., location information of a symbol in which data allocation starts and a symbol in which data allocation ends) and/or M and s information (second information group) among data transmission information through DCI in operation 1240. Thereafter, in operation 1255, the base station generates a data sample using the information stored in the memory 1250 for fast data processing and transmits the data sample to the UE. Here, items included in the first information group and the second information group, which are information groups for data scheduling, may include a combination of all or part of information described in the proposed disclosure.

FIG. 12C illustrates an operation of a base station for an embodiment in which partial configuration information is preconfigured via higher signaling in order to perform fast processing of a low-cost UE.

Referring to FIG. 12C, in operation 1260, the base station is configured to use a predetermined N according to a frequency band to frequency size or a channel size to be used. Thereafter, in operation 1265, the base station transmits N and c information (first information group), which is information for the fast scheduling process proposed in the disclosure, to the UE by using higher layer signaling. The method proposed in the disclosure includes transmitting all or only part of the above-described information depending on its use. In this case, the undelivered information may be predetermined in the standard or may be determined by the type of the UE, the service provided by the UE, or the like. Thereafter, in operation 1275, the base station calculates a weighting factor for pre-generating a sample for fast data processing based on the information transmitted to the UE and stores the calculated weighting factor in the memory 1280. Thereafter, the base station transmits TDRA information (for example, location information of a start symbol and an end symbol and/or information of M (second information group)) among data transmission information, through DCI including the TDRA information and the M information, in operation 1270. For fast data processing, the base station generates a signal by using the information stored in the memory 1280 so that information (or symbol x) to be transmitted is indicated by the frequency position s of the data sample, and transmits the signal to the UE, in operation 1285. Here, items included in the first information group and the second information group, which are information group for data scheduling, may include a combination of all or part of information described in the proposed disclosure.

All operations of the base station shown in FIGS. 12A, 12B and 12C do not necessarily have to be performed, and some operations may be omitted or may be performed by adding operations not shown in the drawings. In addition, it is also possible that operations of the base station are changed and performed differently from the order shown in the figure.

Figure 13:
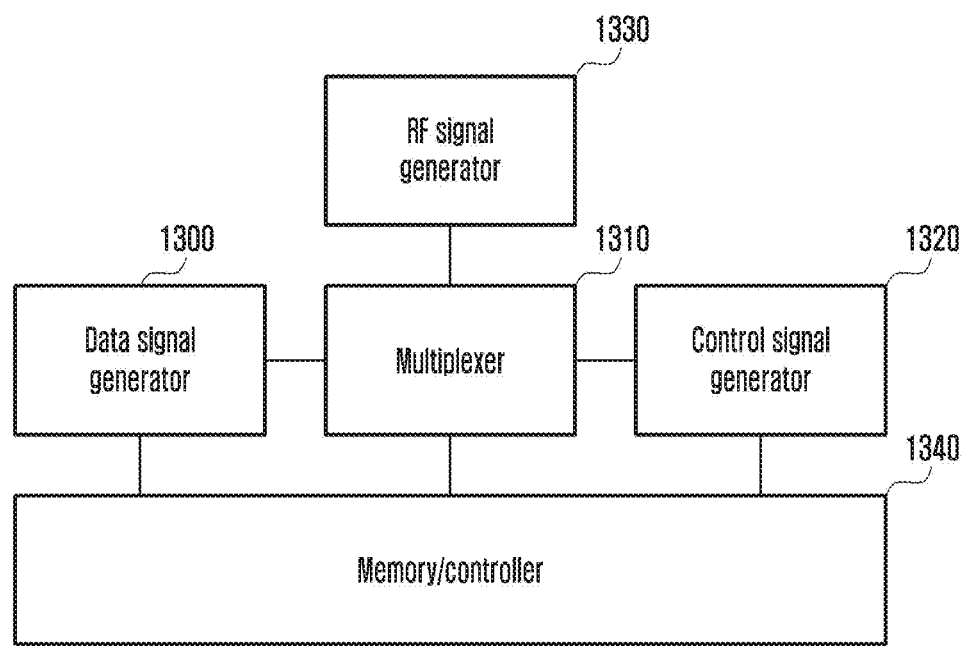
FIG. 13 is a block diagram illustrating a structure of a transmitter according to an embodiment of the disclosure.
Figure 14:
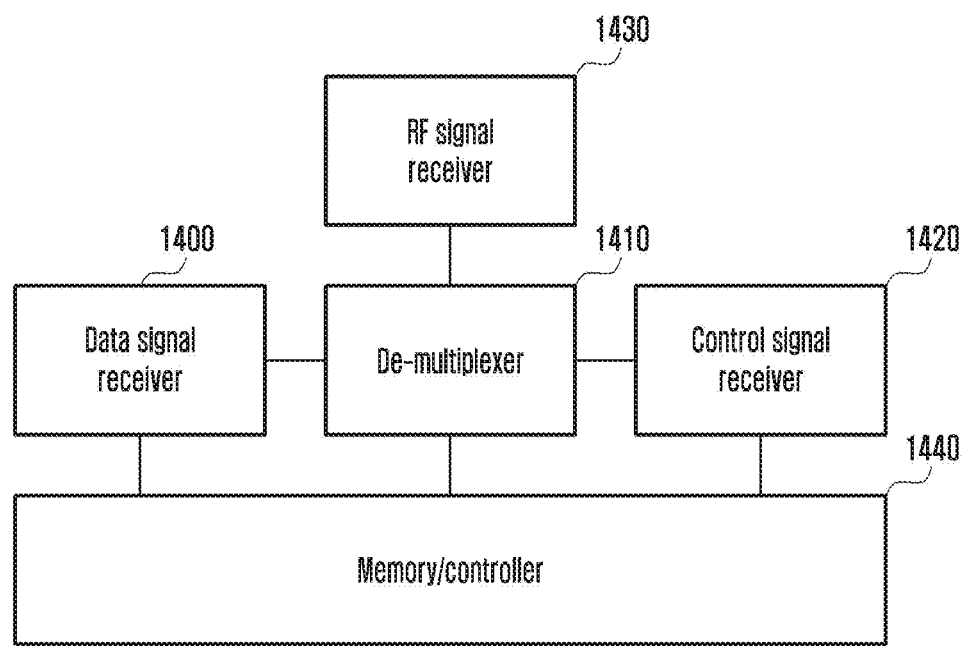
FIG. 14 is a block diagram illustrating a structure of a receiver according to an embodiment of the disclosure.

In order to perform the above-described embodiments, a transceiver, a memory, and a processor of a UE and a base station are shown in FIGS. 13 and 14, respectively.

FIG. 13 is a block diagram illustrating a structure of a transmitter according to an embodiment of the disclosure. The transmitter may be a base station or a UE.

Referring to FIG. 13, the transmitter may include a data signal generator 1300, a multiplexer 1310, a control signal generator 1320, an RF signal generator 1330, and a memory/controller 1340. However, the elements of the transmitter are not limited to the above-described examples, and for example, the UE may include more or fewer elements than the above-described elements. In addition, the data signal generator 1300, the multiplexer 1310, the control signal generator 1320, the RF signal generator 1330, and the memory/controller 1340 may be implemented in the form of a single chip.

According to an embodiment of the disclosure, the data signal generator 1300 is a device configured to generate a transmission sample by modulating a transmission symbol. The control signal generator 1320 is a device configured to modulate control information and generate a transmission sample. The multiplexer 1310 is a device configured to multiplex the generated data and control signal. The RF signal generator 1330 converts a digital signal into an analog signal, up-converts the analog signal into an RF signal, and transmits the generated signal through an antenna. The above-described signal may include control information and data. In addition, the RF signal generator 1330 may be referred to as a transmitter, a transceiver, or the like.

According to an embodiment of the disclosure, the memory/controller 1340 may store programs and data required for the operation of the base station. In addition, the memory/controller 1340 may store control information or data included in a signal transmitted by the transmitter. The memory/controller 1340 may be configured by a storage medium such as a ROM, a RAM, a hard disk, a CD-ROM, and a DVD, or a combination of storage media. In addition, the memory/controller 1340 may include multiple memories and a processor. According to an embodiment of the disclosure, the memory/controller 1340 may store information, data, and a program for fast data processing. In addition, the operations performed by the multiplexer 1310, the control signal generator 1320, and the data signal generator 1300 can be performed by the memory/controller 1340.

According to an embodiment of the disclosure, the memory/controller 1340 may control a series of processes so that the transmitter may operate according to the above-described embodiments of the disclosure.

FIG. 14 is a block diagram illustrating a structure of a receiver according to an embodiment of the disclosure. The receiver may be a UE or a base station.

Referring to FIG. 14, the UE may include an RF signal receiver 1440, a data signal receiver 1400, a de-multiplexer 1410, a control signal receiver 1420, and a memory/controller 1440. However, the elements of the UE are not limited to the above-described examples, and for example, the UE may include more or fewer elements than the above-described elements. In addition, the RF signal receiver 1430, the data signal receiver 1400, the de-multiplexer 1410, the control signal receiver 1420, and the memory/controller 1440 may be implemented in the form of a single chip.

According to an embodiment of the disclosure, the RF signal receiver 1430 may receive a signal from a transmitter. The above-described signal may include control information and data. To this end, the RF signal receiver 1430 may be configured by an RF receiver for down-converting and amplifying a frequency of a received signal. In addition, the RF signal receiver 1430 may be referred to as a receiver, a transceiver, or the like. In addition, the received signal is transmitted through the de-multiplexer 1410, a control channel is transferred to the control signal receiver 1420, a data channel is transferred to the data signal receiver 1400, and the memory/controller 1440 may reconstruct a data signal based on a command reconstructed from the control channel.

According to an embodiment of the disclosure, the memory/controller 1440 may store programs and data required for the operation of the receiver. In addition, the memory/controller 1440 may store control information or data included in a signal transmitted by the transmitter. The memory/controller 1440 may be configured by a storage medium such as a ROM, a RAM, a hard disk, a CD-ROM, and a DVD, or a combination of storage media. In addition, the memory/controller 1440 may include multiple memories. According to an embodiment of the disclosure, the memory/controller 1440 may store information for speeding up data signal processing, data, and a program therefor. In addition, the operations performed by the de-multiplexer 1410, the control signal receiver 1420, and the data signal receiver 1400 can be performed by the memory/controller 1440.

According to an embodiment of the disclosure, the memory/controller 1440 may control a series of procedures so as to allow a base station to operate according to the above-described embodiments of the disclosure.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of one embodiment of the disclosure may be combined with a part of another embodiment to operate a base station and a terminal. Further, the embodiments of the disclosure may be applied to other communication systems, and other variants based on the technical idea of the embodiments may also be implemented. For example, the embodiments may also be applied to LTE, 5G, or NR systems.

The invention claimed is:

1. A method performed by a transmitter in a wireless communication system, the method comprising:
   transmitting, to a receiver, configuration information for signal transmission;
   generating a weight used for signal processing for transmission signal generation, based on the configuration information, and storing the weight;
   transmitting, to the receiver, control information including time domain resource allocation information indicating a signal allocation resource;
   generating a transmission signal by performing the signal processing on a modulation symbol to be transmitted by using the stored weight; and
   transmitting the generated transmission signal to the receiver through the signal allocation resource,
   wherein the weight is multiplied for each time sample of the transmission signal during the signal processing.

2. The method of claim 1, further comprising:
   receiving, from the receiver, UE capability information related to whether high-speed signal processing is possible or whether time domain signal processing is possible.

3. The method of claim 1, wherein the configuration information includes fast Fourier transform size (FFT size) information, allocated frequency resource information, and discrete Fourier transform precoding size (DFT precoding size) information.

4. The method of claim 1, wherein the configuration information includes FFT size information, and
   wherein the control information further includes allocated frequency resource information.

5. A method performed by a receiver in a wireless communication system, the method comprising:
   receiving, from a transmitter, configuration information for signal transmission;
   generating a weight used for signal processing for transmission signal generation, based on the configuration information, and storing the weight;
   receiving, from the transmitter, control information including time domain resource allocation information indicating a signal allocation resource;
   receiving a signal from the transmitter through the signal allocation resource; and
   identifying a modulation symbol by performing the signal processing on the received signal by using the stored weight,
   wherein the weight corresponds to each time sample of the transmission signal during the signal processing.

6. The method of claim 5, further comprising:
   transmitting, to the transmitter, UE capability information related to whether high-speed signal processing is possible or whether time domain signal processing is possible.

7. The method of claim 5, wherein the configuration information includes fast Fourier transform size (FFT size) information, allocated frequency resource information, and discrete Fourier transform precoding size (DFT precoding size) information.

8. The method of claim 5, wherein the configuration information includes FFT size information, and
   wherein the control information further includes allocated frequency resource information.

9. A transmitter in a wireless communication system, the transmitter comprising:
   a transceiver; and
   a controller coupled with the transceiver and configured to:
   transmit, to a receiver, configuration information for signal transmission,
   generate a weight used for signal processing for transmission signal generation, based on the configuration information, and storing the weight,
   transmit, to the receiver, control information including time domain resource allocation information indicating a signal allocation resource, generate a transmission signal by performing the signal processing on a modulation symbol to be transmitted by using the stored weight, and transmit the generated transmission signal to the receiver through the signal allocation resource, wherein the weight is multiplied for each time sample of the transmission signal during the signal processing.

10. The transmitter of claim 9, wherein the controller is further configured to receive, from the receiver, UE capability information related to whether high-speed signal processing is possible or whether time domain signal processing is possible.

11. The transmitter of claim 9, wherein the configuration information includes fast Fourier transform size (FFT size) information, allocated frequency resource information, and discrete Fourier transform precoding size (DFT precoding size) information.

12. The transmitter of claim 9, wherein the configuration information includes FFT size information, and wherein the control information further includes allocated frequency resource information.

13. A receiver in a wireless communication system, the receiver comprising:

a transceiver; and a controller coupled with the transceiver and configured to:

receive, from a transmitter, configuration information for signal transmission, generate a weight used for signal processing for transmission signal generation, based on the configuration information, and storing the weight, receive, from the transmitter, control information including time domain resource allocation information indicating a signal allocation resource, receive a signal from the transmitter through the signal allocation resource, and identify a modulation symbol by performing the signal processing on the received signal by using the stored weight, wherein the weight corresponds to each time sample of the transmission signal during the signal processing.

14. The receiver of claim 13, wherein the controller is further configured to transmit, to the transmitter, UE capability information related to whether high-speed signal processing is possible or whether time domain signal processing is possible.

15. The receiver of claim 13, wherein the configuration information includes fast Fourier transform size (FFT size) information, allocated frequency resource information, discrete Fourier transform precoding size (DFT precoding size) information, or FFT size information, and the control information further includes allocated frequency resource information.

* * * * *